US008630409B2

(12) United States Patent
Woodruff

(10) Patent No.: US 8,630,409 B2
(45) Date of Patent: Jan. 14, 2014

(54) TWO-PARTY PRIVATE ESTIMATION OF DATASET SIMILARITY

(75) Inventor: David Paul Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/080,342

(22) Filed: Apr. 5, 2011

(65) Prior Publication Data

US 2012/0260348 A1    Oct. 11, 2012

(51) Int. Cl.
*H04L 29/06* (2006.01)
(52) U.S. Cl.
USPC ............................................. 380/28; 713/168
(58) Field of Classification Search
USPC ............................................. 380/28; 713/168
See application file for complete search history.

(56) References Cited

U.S. PATENT DOCUMENTS

| | | | |
|---|---|---|---|
| 6,931,400 B1 | 8/2005 | Indyk et al. | |
| 7,237,116 B1 * | 6/2007 | Dwork et al. | 713/180 |
| 7,415,464 B1 | 8/2008 | Indyk et al. | |

(Continued)

OTHER PUBLICATIONS

"Polylograithmic Private Approximations and Efficient Matching", Piotr Indyk and David Woodruff, TCC 2006, LNCS 3876, pp. 245-264, 2006.*

(Continued)

*Primary Examiner* — Edward Zee
*Assistant Examiner* — Chi Nguy

(74) *Attorney, Agent, or Firm* — Fleit Gibbons Gutman Bongini & Bianco PL; Thomas Grzesik

(57) ABSTRACT

A two-party approximation protocol is transformed into a private approximation protocol. A first input $x \in \{0, 1, \ldots, M\}^n$ and a second input $y \in \{0, 1, \ldots, M\}^n$ of a two party approximation protocol approximating a function of a form $f(x, y) = \sum_{j=1}^{n} g(x_j, y_j)$ is received. Variable B is set as a public upper bound on $f(x, y)$. Variable l is set $l = O^*(1)$. The following is performed until $$\sum_{j=1}^{l} z_j \geq \frac{l}{t}$$

or B<1, where t is an arbitrary number: (1) a private importance sampling protocol with the first input x, the second input y, and a third input $1^k$, is executed independently for $j \in [l]$, where k is a security parameter, an output of the private importance sampling protocol is shares of $I_j \in [n] \cup \{\bot\}$; (2) l coin tosses $z_1, \ldots, z_l$ are independently generated where $z_j = 1$ iff $I_j \neq \bot$; and (3) B is divided by 2 if $$\sum_{j=1}^{l} z_j \geq \frac{l}{t}$$

or B<1 is not satisfied. When $$\sum_{j=1}^{l} z_j \geq \frac{l}{8}$$

or B<1 a private $(\epsilon, \delta)$-approximation $\Psi$ protocol for $f(x, y) = \sum_{j=1}^{n} g(x_j, y_j)$ is outputted where $$\Psi = \frac{2B}{l} \sum_{j=1}^{l} z_j,$$

$\epsilon$ is an arbitrary number, and $\delta = \exp(-k)$.

9 Claims, 5 Drawing Sheets

200

Main Protocol:
Input: Alice is given $x \in \{-M, \ldots, M\}^n$ and $k$, while Bob is given $y \in \{-M, \ldots, M\}^n$, and $k$.
Output: A private $(\epsilon, \delta)$-approximation protocol for $f(x,y) = \sum_{j=1}^{n} g(x_j, y_j)$.

1. Let $B$ be public upper bound on $f(x,y)$, for any possible inputs $x,y$. Assume log $B = O^*(1)$, Let $l = O^*(1)$ be sufficiently large.

2. Repeat the following in a secure circuit with ROM:
   (a) For $j \in [l]$, independently run $g$-SAMPLER$(x,y, 1^k)$, let the output be shares of $I_j \in [n] \cup \{\bot\}$.
   (b) Independently generate $l$ coin tosses $z_1, \ldots, z_l$, where $z_j = 1$ iff $I_j \neq \bot$.
   (c) $B = B/2$.

3. Until $\sum_{j=1}^{l} z_j \geq \frac{l}{8}$ or $B < 1$.

4. Output $\Psi = \frac{2B}{l} \sum_{j=1}^{l} z_j$

(56) References Cited

U.S. PATENT DOCUMENTS

| | | | |
|---|---|---|---|
| 7,487,150 | B2 | 2/2009 | Brown et al. |
| 7,562,077 | B2 | 7/2009 | Bisson et al. |
| 7,627,602 | B2 | 12/2009 | Indyk et al. |
| 2006/0095378 | A1 | 5/2006 | Aggarwal et al. |
| 2006/0245587 | A1 | 11/2006 | Pinkas et al. |
| 2007/0081664 | A1* | 4/2007 | Avidan et al. .......... 380/28 |
| 2008/0275908 | A1 | 11/2008 | Indyk et al. |
| 2010/0057805 | A1 | 3/2010 | Indyk et al. |
| 2010/0063974 | A1 | 3/2010 | Papadimitriou et al. |

OTHER PUBLICATIONS

"A Firm Foundation for Private Data Analysis", Cynthia Dwork, Microsoft Research, ACM, pp. 1-8, Jan. 2011.*

"On Communication Protocols that Compute Almost Privately", Marco Comi, Bhaskar DasGupta, Michael Schapiram and Venkatakumar Srinivasan, pp. 1-12, Feb. 7, 2011.*

Freedman, Michael J., et al., "Efficient Private Matching and Set Intersection," EUROCRYPT 2004, pp. 1-8.

Gentry, C., "Fully Homomorphic Encryption Using Ideal Lattices," STOC '09, May 31-Jun. 2, 2009, Bethesda, Maryland, Copyright 2009, ACM 978-1-60558-506-02/09/05.

Guha, S., et al., "Sketching Information Divergences," COLT 2007: 424-438.

Guha, S., et al., "Streaming and Sublinear Approximation of Entropy and Information Distances," SODA '06, Jan. 22-26, Miami, Florida, Copyright 2006, SIAM ISBN 0-89871-605-05/06/01.

Harvey, M.J.A., et al., "Sketching and Streaming Entropy Via Approximation Theory," 49th Annual Symposium on Foundations of Computer Science, FOCS 2008, pp. 489-498, 2008.

Hemenway, B., et al., "Public Key Encryption Which is Simultaneously a Locally-Decodable Error-Correcting Code," Electronic Colloquium on Computational Complexity, Report No. 21, Publication: Mar. 13, 2007.

Indyk, P., et al., "Optimal Approximations of the Frequency Moments of Data Streams," STOC '05, May 22-24, 2005, Baltimore, Maryland, Copyright 2005 ACM 1-58113-960-0/05/0005.

Indyk, P., et al., "Polylogarithmic Private Approximations and Efficient Matching," Copyright Springer-Verlag Berlin Heidelberg 2006.

Jayram, T.S., et al., "The Data Stream Space Complexity of Cascaded Norms," 2009 50th Annual IEEE Symposium on Foundations of Computer Science, Atlanta, Georgia, Oct. 25-27, 2009, pp. 765-774.

Kane, D.M., et al., "An Optimal Algorithm for the Distinct Elements Problem," PODS'10, Jun. 6-11, 2010, Indianapolis, Indiana, Copyright 2010 SCM 978-1-4503-0033-9/10/06.

Kawachi, A., et al., "Multi-Bit Cyrptosystems Based on Lattice Problems," Public Key Cryptography 2007, pp. 315-329.

Melchor, C.A., et al., "Additively Homomorphic Encryption with d-Operand Multiplications," published on the web at: http://eprint,iacr.org/2008/378.pdf, 2008.

Kilian, J., et al., "Fast Private Norm Estimation and Heavy Hitters," R. Canetti (Ed.): TCC 2008, LNCS 4948, pp. 176-193, 2008, Copyright International Association for Cryptologic Research 2008.

Melchor, C.A., et al., "Lattice-based Homomorphic Encryption of Vector Spaces," ISIT 2008, Toronto, Canada, Jul. 6-11, 2008, 978-1-4244,2571-6/08, copyright 2008 IEEE.

Melchor, C.A., et al., "A Lattice-Based Computationally-Efficient Private Information Retrieval Protocal," WEWORC Jul. 2007, Bochum, Germany; Cryptology ePrint Archive: Report 2007/446.

Misra, J. et al., "Finding Repeated Elements," Department of Computer Science, Cornell University, Ithaca, NY., TR 82-505, Jul. 1982.

Monemizadeh, M., et al., "1-Pass Relative-Error Lp-Sampling with Applications," 20th Annual ACM-SIAM Symposium on Discrete Algorithms (SODA 2010) pp. 1143-1160.

Nelson, J., et al., "A Near-Optimal Algorithm for L1-Difference," CoRR Electronic Colloquium on Computational Complexity (ECCC) 16:46 (2009).

* cited by examiner

Main Protocol:
Input: Alice is given $x \in \{-M, ..., M\}^n$ and $k$, while Bob is given $y \in \{-M, ..., M\}^n$, and $k$.
Output: A private $(\varepsilon, \delta)$-approximation protocol for $f(x,y) = \sum_{j=1}^{n} g(x_j, y_j)$.

1. Let $B$ be public upper bound on $f(x,y)$, for any possible inputs $x, y$. Assume $\log B = O^*(1)$. Let $\ell = O^*(1)$ be sufficiently large.

2. Repeat the following in a secure circuit with ROM:
   (a) For $j \in [\ell]$, independently run $g$-SAMPLER$(x, y, 1^k)$, let the output be shares of $I_j \in [n] \cup \{\bot\}$.
   (b) Independently generate $\ell$ coin tosses $z_1, ..., z_\ell$, where $z_j = 1$ iff $I_j \neq \bot$.
   (c) $B = B/2$.

3. Until $\sum_{j=1}^{\ell} z_j \geq \frac{\ell}{8}$ or $B < 1$.

4. Output $\Psi = \frac{2B}{\ell} \sum_{j=1}^{\ell} z_j$

Input: Alice is given $x \in \{-M, ..., M\}^n$ and $k$, while Bob is given $y \in \{-M, ..., M\}^n$ and $k$.
Both parties are given an integer $B \geq 2 \sum_{j=i}^{n} g(x_j, y_j)$.
Output: The parties output a secret-sharing of a random $I \in [n] \cup \{\bot\}$ from a distribution statistically close to $\forall_i$, $\Pr[I = i] = \frac{g(x_i, y_i)}{B}$, and $\Pr[\bot] = 1 - \sum_{j=1}^{n} \frac{g(x_j, y_j)}{B}$ 1. Initiates $S = [n]$, $\delta = \exp(-k)$, $\zeta = \theta(\frac{1}{\log n})$, $\beta = 1$, and $q$ to be a pointer to the root of a complete binary tree on $n$ leaves.

Let $G$ be a PRG stretching $O^*(1)$ bits to $O^*(n)$ bits secure against poly($n$)-sized circuits that can be evaluated in $O^*(n)$ time. Such $G$ are implied based on SPIR.

Alice sends Bob a seed $\gamma$ to $G$, from which the parties share the random string $G(\gamma) = \sigma$.

2. For $j = 1, 2, ..., \log n$, in the $j$-th iteration do:

(a) Alice and Bob break the coordinate set $[n]$ into $\frac{n}{2^j}$ contiguous blocks of coordinates $x^1, ..., x^{2^j}$ and $y^1, ..., y^{2^j}$, respectively.

(b) Alice and Bob respectively execute TPAP($\frac{n}{2^j}$, $\zeta$, $\delta$) on $x^\ell$ and $y^\ell$ for each $\ell \in [2^j]$, using $\sigma$ as the randomness for each execution. Let the resulting states of TPAP be $\text{state}_A(1), \text{state}_A(2), ..., \text{state}_A(2^j)$ and $\text{state}_B(1), \text{state}_B(2), ..., \text{state}_B(2^j)$, the ROM tables of the parties.

(c) A secure circuit with ROM performs the following algorithm:
      i. It maintains the state of $q$ internally (it is secret-shared between the two parties).
      ii. Viewing the set $[2^j]$ as the internal nodes in the $j$-th level of a complete binary tree, it uses SPIR to retrieve $\text{state}_A(L)$, $\text{state}_A(R)$, $\text{state}_B(L)$ and $\text{state}_B(R)$, where $L$ and $R$ are the left and right child of $q$, respectively.
      iii. It combines $\text{state}_A(L)$ and $\text{state}_B(L)$ to obtain $p_L = \text{TPAP}(\frac{n}{2^j}, \zeta, \delta)(x^L, y^L)$. It combines $\text{state}_A(R)$ and $\text{state}_B(R)$ to obtain $p_R = \text{TPAP}(\frac{n}{2^j}, \zeta, \delta)(x^R, y^R)$.
      iv. Suppose first that $(p_L, p_R) \neq (0,0)$. It sets $q$ to point to $L$ with probability $\frac{p_L}{p_L + p_R}$, and otherwise sets $q$ to point to $R$. In the first case it sets $\beta = \beta \cdot \frac{p_L}{p_L + p_R}$. In the second case, it sets $\beta = \beta \cdot \frac{p_R}{p_L + p_R}$. If $(p_L, p_R) = (0,0)$, it outputs a pointer $q$ to $\bot$ and $\beta$ remains the same.
      v. If $j = \log n$, it outputs a secret-sharing $(e, f)$ of $q$ and $\beta$ to the two parties.

3. Alice and Bob create ROM tables for the entries of $x$ and $y$ respectively.

4. A secure circuit with ROM performs the following algorithm:

(a) It uses inputs $e$ and $f$ to reconstruct $q$ and $\beta$. If $q$ points to $\bot$, it outputs a secret-sharing of $\bot$ to the two parties.

(b) Otherwise, it uses SPIR to retrieve $x_q$ and $y_q$, and computes $g(x_q, y_q)$.

(c) Put $p = \frac{g(x_q, y_q)}{B \cdot \beta}$. If $p > 1$, output fail.

(d) Otherwise, with probability $p$, output a secret sharing of $q$ to the two parties, else output a secret sharing of $\bot$.

5. The parties output the output of the secure circuit evaluation in step 4.

The simulator $S$ is given $f(x,y)$.

1. Let $B$ be an upper bound on $f(x,y)$, for any possible inputs $x,y$. Assume $\log B = O^*(1)$. Let $\ell = O^*(1)$ be sufficiently large.

2. Repeat the following:
   (a) For $j \in [\ell]$, generate $\ell$ independent coin tosses $z_j$ with bias $\frac{f(x,y)}{B}$.
   (b) $B = B/2$.

3. Until $\sum_{j=1}^{\ell} z_j \geq \frac{\ell}{8}$ or $B < 1$.

4. Output $\Psi' = \frac{2B}{\ell} \sum_{j=1}^{\ell} z_j$.

| Problem | Communication | Work |
|---|---|---|
| $\ell_p$-distance, $p > 2$, $\ell_p$-heavy hitters, and $\ell_p$-sampling | $O^*(n^{1-2/p})$ | $O^*(n)$ |
| $\ell_p$-distance, $p \in [0,2]$, $\ell_p$-heavy hitters, and $\ell_p$-sampling | $O^*(1)$ | $O^*(n)$ |
| $\sum_{j=1}^{n} h(x_j - y_j)$, $h$ satisfies tractability conditions | $O^*(1)$ | $O^*(n)$ |
| Max-Dominance norm and other dominant $\ell_p$- norms | $O^*(1)$ | $O^*(n)$ |
| Distinct Summation | $O^*(1)$ | $O^*(n)$ |
| Entropy | $O^*(1)$ | $O^*(n)$ |
| Cascaded Moments $F_q(F_p)$ of $n \times d$ matrix, every $q$ and $p$ | $O^*(CC\text{-non-private}(F_q(F_p)))$ | $O^*(nd)$ |
| Subspace Approximation of $n$ points in $R^d$ and Block Sampling | $O^*(d)$ | $O^*(nd)$ |
| $\ell_2$-Distance to Independence | $O^*(1)$ | $O^*(n^2)$ |

FIG. 5

TWO-PARTY PRIVATE ESTIMATION OF DATASET SIMILARITY

BACKGROUND

The present invention generally relates to data privacy, and more particularly relates to private approximation protocols.

The availability of distributed massive datasets has led to significant privacy concerns. While generic techniques such as secure function evaluation (SFE) and fully homomorphic encryption (FHE) are available, such techniques concern exact computation. For large datasets, computing even basic statistics exactly is prohibitive or impossible.

BRIEF SUMMARY

In one embodiment, a method for transforming a two-party approximation protocol into a private approximation protocol is disclosed. The method comprises receiving a first input $x \in \{0, 1, \ldots, M\}^n$ and a second input $y \in \{0, 1, \ldots, M\}^n$ of a two party approximation protocol (TPAP) for approximating a function of a form $f(x, y) = \sum_{j=1}^{n} g(x_j, y_j)$, where g is any non-negative efficiently computable function. Variable B is set as a public upper bound on $f(x, y)$ for the first input x and the second input y. The variable $l = O^*(1)$. The following is performed until $$\sum_{j=1}^{l} z_j \geq \frac{l}{t}$$

or B<1, where t is an arbitrary number: (1) a private importance sampling protocol is executed with the first input x, the second input y, and a third input $1^k$, independently for $j \in [l]$, where k is a security parameter. The output of the private importance sampling protocol is shares of $I_j \in [n] \cup \{\bot\}$; (2) l coin tosses $z_1, \ldots, z_l$, where $z_j = 1$ iff $I_j \neq \bot$ are independently generated; and (3) B is divided by 2. A determination is made that $$\sum_{j=1}^{l} z_j \geq \frac{l}{8}$$

or B<1. A private $(\epsilon, \delta)$-approximation protocol $\Psi$ for $f(x, y) = \sum_{j=1}^{n} g(x_j, y_j)$, where $$\Psi = \frac{2B}{l} \sum_{j=1}^{l} z_j,$$

$\epsilon$ is an arbitrary number, and $\delta = \exp(-k)$ is outputted.

In another embodiment, an information processing system for transforming a two-party approximation protocol into a private approximation protocol is disclosed. The information processing system comprises a memory and a processor that is communicatively coupled to the memory. A private approximation protocol generator is communicatively coupled to the processor and the memory. The private approximation protocol generator is configured to perform a method. The method comprises receiving a first input $x \in \{0, 1, \ldots, M\}^n$ and a second input $y \in \{0, 1, \ldots, M\}^n$ of a two party approximation protocol TPAP for approximating a function of a form $f(x, y) = \sum_{j=1}^{n} g(x_j, y_j)$, where g is any non-negative efficiently computable function. Variable B is set as a public upper bound on $f(x, y)$ for the first input x and the second input y. The variable $l = O^*(1)$. The following is performed until $$\sum_{j=1}^{l} z_j \geq \frac{l}{t}$$

or B<1, where t is an arbitrary number: (1) a private importance sampling protocol is executed with the first input x, the second input y, and a third input $1^k$, independently for $j \in [l]$, where k is a security parameter. The output of the private importance sampling protocol is shares of $I_j \in [n] \cup \{\bot\}$; (2) l coin tosses $z_1, \ldots, z_l$, where $z_j = 1$ iff $I_j \neq \bot$ are independently generated; and (3) B is divided by 2. A determination is made that $$\sum_{j=1}^{l} z_j \geq \frac{l}{8}$$

or B<1. A private $(\epsilon, \delta)$-approximation protocol $\Psi$ for $f(x, y) = \sum_{j=1}^{n} g(x_j, y_j)$, where $$\Psi = \frac{2B}{l} \sum_{j=1}^{l} z_j,$$

$\epsilon$ is an arbitrary number, and $\delta = \exp(-k)$ is outputted.

In yet another embodiment, a computer program product for transforming a two-party approximation protocol into a private approximation protocol is disclosed. The computer program product comprises a storage medium readable by a processing circuit and storing instructions for execution by the processing circuit for performing a method. The method comprises receiving a first input $x \in \{0, 1, \ldots, M\}^n$ and a second input $y \in \{0, 1, \ldots, M\}^n$ of a two party approximation protocol TPAP for approximating a function of a form $f(x, y) = \sum_{j=1}^{n} g(x_j, y_j)$, where g is any non-negative efficiently computable function. Variable B is set as a public upper bound on $f(x, y)$ for the first input x and the second input y. The variable $l = O^*(1)$. The following is performed until $$\sum_{j=1}^{l} z_j \geq \frac{l}{t}$$

or B<1, where t is an arbitrary number: (1) a private importance sampling protocol is executed with the first input x, the second input y, and a third input $1^k$, independently for $j \in [l]$, where k is a security parameter. The output of the private importance sampling protocol is shares of $I_j \in [n] \cup \{\bot\}$; (2) l coin tosses $z_1, \ldots, z_l$, where $z_j = 1$ iff $I_j \neq \bot$ are independently generated; and (3) B is divided by 2. A determination is made that $$\sum_{j=1}^{l} z_j \geq \frac{l}{8}$$

or B<1. A private ($\epsilon$, $\delta$)-approximation protocol $\Psi$ for $f(x, y) = \sum_{j=1}^{n} g(x_j, y_j)$, where $$\Psi = \frac{2B}{l} \sum_{j=1}^{l} z_j,$$

$\epsilon$ is an arbitrary number, and $\delta = \exp(-k)$ is outputted.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 shows pseudo code for transforming a two-party approximation protocol into a private approximation protocol according to one embodiment of the present invention;

FIG. 3 shows pseudo code for a private importance sampling protocol according to one embodiment of the present invention;

FIG. 4 shows pseudo code for a simulator according to one embodiment of the present invention; and FIG. 5 is a table summarizing results from the transformation shown in FIGS. 2 and 3.

DETAILED DESCRIPTION

Operating Environment

Figure 1:
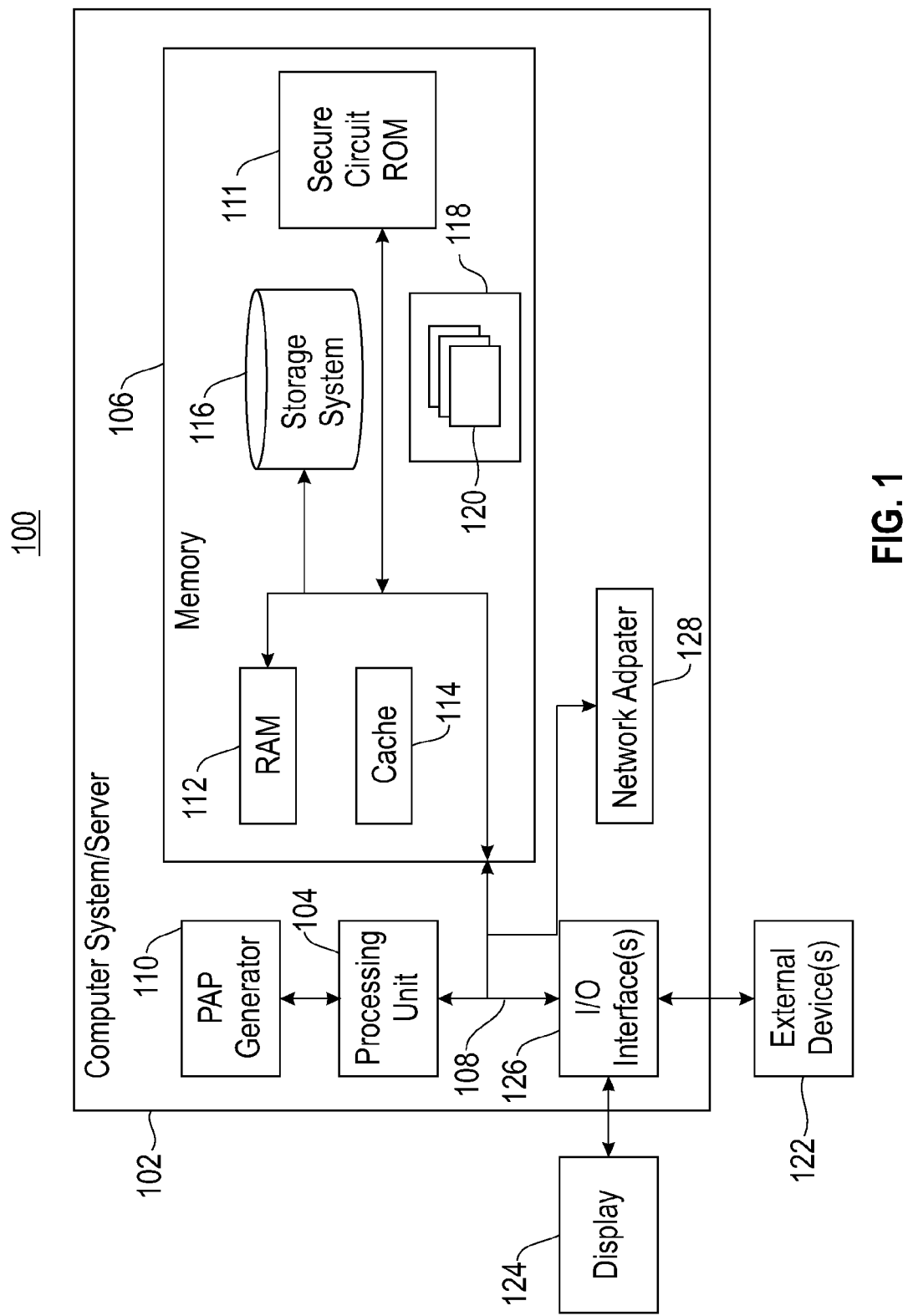
FIG. 1 is a block diagram illustrating an operating environment according to one embodiment of the present invention.

FIG. 1 shows an operating environment 100 applicable to one embodiment of the present invention. In particular, FIG. 1 shows a computer system/server 102 that is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, distributed cloud computing environments that include any of the above systems or devices, and the like. Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

The computer system/server 102 is illustratively shown in the form of a general-purpose computing device. The components of computer system/server 102 include, but are not limited to, one or more processors or processing units 104, a system memory 106, and a bus 108 that couples various system components including system memory 106 to processor 104. The bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102 and includes both volatile and non-volatile media, and removable and non-removable media. The system memory 106 of this embodiment includes computer system readable media in the form of volatile memory, such as random access memory (RAM) 112 and cache memory 114.

Computer system/server 102 can further include other removable/non-removable, volatile/non-volatile computer system storage media. By way of example, storage system 116 of this embodiment is provided for reading from and writing to a non-removable, non-volatile magnetic media (i.e., a "hard drive"). A magnetic disk drive for reading from and writing to a removable, non-volatile magnetic disk (i.e., a "floppy disk"), and an optical disk drive for reading from or writing to a removable, non-volatile optical disk such as a CD-ROM, DVD-ROM, or other optical media can also be provided. In such instances, each is connected to bus 108 by one or more data media interfaces. Additionally, memory 106 includes at least one program product having one or more program modules that are configured to carry out the functions of embodiments of the present invention.

Program/utility 118, having one or more program modules 120, is stored in memory 106. In this embodiment, Program/utility 118 also includes an operating system, one or more application programs, other program modules, and program data. Each of the operating system, one or more application programs, other program modules, and program data, or some combination thereof, may include an implementation of a networking environment. Program modules 120 generally carry out the functions and/or methodologies of embodiments of the present invention.

The computer system/server 102 also comprises a private approximation protocol (PAP) generator 110 that performs one or more of the functions discussed below with respect to FIGS. 2-4 for transforming an approximation function into a PAP. The PAP generator 110 can be implemented in software and/or hardware. For example, at least part of the PAP generator 110 can be implemented in the memory 106 and/or in a secure circuit Read Only Memory (ROM) 111. Computer system/server 102 also communicates with one or more external devices 122, such as a keyboard, a pointing device, a display 124, etc.; one or more devices that enable a user to interact with computer system/server 126; and/or any devices (e.g., network card, modem, etc.) that enable computer system/server 102 to communicate with one or more other computing devices. Such communication occurs via I/O interfaces 126. Still yet, computer system/server 102 communicates with one or more networks such as a local area network (LAN), a general wide area network (WAN), and/or a public network (e.g., the Internet) via network adapter 128. As depicted, network adapter 1026 communicates with the other components of computer system/server 102 via bus 108. Additionally, other hardware and/or software components can be used in conjunction with computer system/server 102. Examples include microcode, device drivers, redundant processing units, external disk drive arrays, RAID systems, tape drives, data archival storage systems, etc.

Overview

An approximation protocol for a function $f$ is a two-party protocol in which one party has an input vector x, the other has an input vector y, and the parties output an approximation to $f(x, y)$. The approximation protocol is private if the parties do not learn anything about each other's input other than what follows from the exact value $f(x, y)$. It is insufficient to use secure function evaluation or fully homomorphic encryption on a standard, non-private protocol for approximating f. This is because the approximation may reveal information about x and y that does not follow from $f(x, y)$. In the past, efficient private approximation protocols were only known for a few specific problems.

One type of private approximation protocol is a two-party private approximation protocol. Generally speaking, a two-party protocol for a function $f(x, y)$, where the first party has input x and the second input y, is a private approximation protocol (PAP) of $f(x, y)$ if it satisfies the following two properties. First, the output F(x, y) must be a functionally private approximation (FPA). That is, it approximates $f(x, y)$ in the usual sense, for example, is an ($\epsilon$, $\delta$)-approximation (F(x, y) is an ($\epsilon$, $\delta$)-approximation of $f(x, y)$ if $\forall x, y, Pr[(1-\epsilon)f(x, y) \leq F(x, y) \leq (1+\epsilon)f(x, y)] \geq 1-\delta$), and its distribution can be simulated given only the exact function value $f(x, y)$. Thus, an FPA captures the intuition that each party learns nothing about the other party's input from the output except what follows from $f(x, y)$ and the party's own input. The second condition of a PAP is that the entire view of the parties can be simulated given only $f(x, y)$.

In general, it is insufficient to perform secure function evaluation (SFE) or fully homomorphic encryption (FHE) on a standard, non-private protocol for approximating f. This is because the approximation F(x, y) may reveal information about x and y that does not follow from $f(x, y)$. For example, if $f(x, y)$ is the Hamming distance between x and y, the least significant bit of the approximation may equal an arbitrary bit of x. Given a protocol that outputs an FPA, it can be compiled in a generic way using an FHE to obtain a PAP by increasing the computation, communication, and round complexity by an O*(1) factor. The notation O*($f$) means $f(k, n, M, \epsilon)(k\epsilon^{-1} \log(nM)\log 1/\delta)$, where k is a security parameter. Thus, the main focus of previous work on PAPs is on designing FPAs. An FPA is also independently motivated, for instance, if two honest parties wish to publish a statistic of their joint data that is functionally private.

Similarity estimation is a basic primitive for comparing massive data sets. A generic similarity measure between vectors x, y $\in \{-M, -M+1, \ldots, M\}^n$ is $\Sigma_{j=1}^n g(x_j, y_j)$, for some function g. One of the well-studied similarity measures is the $l_p$-distance $\|x-y\|_p$ for $p \geq 0$, or equivalently, the p-th power of the $l_p$-distance, known as the p-th frequency moment. Here, the function $g(z)=|z|^p$, so that $\|x-y\|_p^p=\Sigma_{j=1}^n |x_j-y_j|^p$. When p=0, then $0^0$ is interpreted as 0, and so $l_0$ measures the number of coordinates for which x and y differ.

One known PAP for the $l_p$-distances gives an O*($\sqrt{n}$) communication protocol for privately approximating the Hamming distance between bit-strings. This has been extended to O*(1) communication and O*($n^2$) work for the Euclidean distance, for which Hamming distance on bit-strings is a special case. It has also been reduced to O*(n) using the FFT. There are also known PAPs for the problem of finding the $l_2$-heavy hitters of x-y, and to a weaker extent the $l_1$-heavy hitters. The latter problem is used to detect all coordinates i for which $|x_i-y_i|$ is large. There is also a known FPA of the $l_p$-distance which critically relies on p-stable distributions for $p \in (0, 2]$. Nothing is known for $p \in \{0\} \cup (2, \infty)$, despite these being well-studied distances. The case p=0 is known as the Hamming norm, a generalization of Hamming distance to non-binary strings, while p=3 is the skewness and p=4 the kurtosis.

Embodiments of the present invention provide private approximation protocols (PAPs) for one or more of these functions. For example, one embodiment provides the following general transformation: any two-party protocol for outputting a (1+$\epsilon$)-approximation to $f(x, y)=\Sigma_{j=1}^n g(x_j, y_j)$ with probability of at least ⅔, for any non-negative efficiently computable function g, can be compiled (e.g., via the PAP generator) into a two-party private approximation protocol with only a polylogarithmic factor loss in communication, computation, and round complexity. In general, it is insufficient to use secure function evaluation or fully homomorphic encryption on a standard, non-private protocol for approximating f. This is because the approximation may reveal information about x and y that does not follow from $f(x, y)$.

By applying the transformation and variations of it provided by embodiments of the present invention, near-optimal private approximation protocols are obtained for a wide range of problems in data streaming Near-optimal private approximation protocols are provided for the $l_p$-distance for every $p \geq 0$, for the heavy hitters and importance sampling problems with respect to any $l_p$-norm, for the max-dominance and other dominant $l_p$-norms, for the distinct summation problem, for entropy, for cascaded frequency moments, for subspace approximation and block sampling, and for measuring independence of datasets. Using a result for data streams, embodiments obtain private approximation protocols with polylogarithmic communication for every non-decreasing and symmetric function $g(x_j, y_j)=h(x_j-y_j)$ with at most quadratic growth. If the original (non-private) protocol is a simultaneous protocol, e.g., a sketching algorithm, then the only cryptographic assumption is efficient symmetric computationally-private information retrieval; otherwise it is fully homomorphic encryption. The various protocols provided by embodiments of the present invention generalize straightforwardly to more than two parties.

Protocol Privacy Definition and Tools

The following is a discussion of the various preliminaries for the PAP transformation process (e.g., as performed by the PAP generator). With respect to the security parameter k, in this illustrative embodiment this parameter is set to k=(n). Thus, in the following definitions of privacy, it is insufficient to protect against (k)-time adversaries, as the parties themselves run in (n) time. Hence, throughout security is defined with respect to exp(k)-time algorithms. In this embodiment, the notion of computational indistinguishability is needed. Distributions $\mathcal{D}_1$ and $\mathcal{D}_2$ are computationally indistinguishable, denoted $\mathcal{D}_1 \mathcal{D}_2$, if for every pair of random variables $X_1 \sim \mathcal{D}_1$ and $X_2 \sim \mathcal{D}_2$ and for any family of exp(k)-size circuits $\{C_k\}$, $|Pr[C_k(X_1)=1]-Pr[C_k(X_2)=1]|=\exp(-k)$.

A two-party private protocol will now be defined. Given two parties/entities, Alice and Bob, let h be a possibly randomized mapping from input pairs (a, b) to output pairs (c, d). A randomized synchronous protocol proceeds in rounds. In each round a party sends a message based on the security parameter k, the party's input and random tape, as well as messages passed in previous rounds. During each round either party may decide to terminate based on the party's view, which is a party's input and its random tape together with all messages exchanged. It should be noted that in this embodiment a random tape of an entity is a string of random bits stored in memory by the entity and unknown to the other entity. Such a string can be generated in various ways, e.g., by using a random number generator such as AES (Advanced Encryption Standard).

To capture the privacy of a protocol Π for a mapping h, the random variable $REAL_{\Pi, A}(k, (a, b))$ is used. This contains the view of Alice in Π with the input to the protocol set to (a, b), concatenated with the output of Bob (this concatenation is required for technical reasons). $REAL_{\Pi, B}(k, (a, b))$ is similarly defined. Next, for an efficient ((n)-time) algorithm S known as a simulator, let $IDEAL_{\Pi, A, S, h}(k, (a, b))$ be the output of the random process: (1) apply h to (a, b), resulting in a pair of outputs (c, d), (2) invoke S on (k, a, c), and (3) concatenate the output of S with d. $IDEAL_{\Pi, B, S, h}(k, (a, b))$ is similarly defined.

A private two-party protocol Π of a randomized mapping h is a protocol for which: (1) the distribution on outputs has $l_1$-distance exp(−k) from that of h, and (2) there is an efficient ((n)-time) simulator $S_A$ such that for any input pair (a, b), there is $\{REAL_{\Pi, A}(k, (a, b))\}_{k \in N} \{IDEAL_{\Pi, A, S_A, h}(k, (a, b))\}_{k \in N}$. There is also an efficient simulator $S_B$ with the analogous property for Bob.

The notion of a symmetric computationally-private information retrieval (SPIR) protocol is used (i.e., Alice has a string $a \in \{0, 1\}^n$ while Bob has an index $i \in [n]$). The randomized mapping is $h(a, i) = a_i$, and an SPIR protocol is a private protocol for h.

It is known how to construct an SPIR protocol from a PIR protocol (namely, a protocol for SPIR which relaxes privacy to only require that there is a simulator $S_B$ in the above definition for a private two-party protocol Π, rather than both simulators $S_A$ and $S_B$). The PIR to SPIR transformation only incurs an O*(1) factor blowup in communication, computation, and number of rounds. Let C(n) be the communication of a PIR protocol with O*(n) work per party and O*(1) rounds. C(n) can be as low as O*(1). It is assumed that such a scheme exists in the following.

As an example, two parties are said to jointly evaluate a circuit with ROM if the (randomized) mapping the parties compute can be expressed as a circuit whose gates, in addition to those of a complete basis on bitstrings, can be lookup gates. Here, Alice (resp. Bob) builds a table $R_A \in \{0, 1\}^n$ (resp. $R_B$), and the lookup gate, given a pair (A, j) (resp. (B, j)), outputs $R_A(j)$ (resp. $R_B(j)$).

Given a PIR (and hence an SPIR) scheme with C(n)=O*(n), any circuit with ROM Λ can be privately computed with O*(|Λ|) communication, O*(n|Λ|) work, and O*(|Λ|) rounds, where |Λ| is the number of gates in Λ.

A standard composition theorem will now be given. An oracle-aided protocol using an oracle functionality $\mathcal{O}$ privately computes h if there are simulators $S_A$ and $S_B$ as in the above definition for a private two-party protocol Π, where the corresponding views of the parties are defined in the natural manner to include oracle answers. Suppose there is a private oracle-aided protocol for h given oracle functionality $\mathcal{O}$, and a private protocol for computing h. Then the protocol defined by replacing each oracle-call to $\mathcal{O}$ by a protocol that privately computes $\mathcal{O}$ is a private protocol for h.

Transformation of an Approximation Protocol into a PAP

The following is a detailed discussion on transforming any two-party protocol for approximating a function ƒ(x, y) of the form $f(x, y) = \Sigma_{j=1}^n g(x_j, y_j)$, for any non-negative efficiently computable function g, into a PAP for ƒ(x, y) with the same communication, computation, and round complexity, up to an O*(1) factor. The computation also increases by an additive O*(n), but this does not affect the asymptotic complexity of any problem considered here, because all problems here require at least linear time. Despite the intuition that designing PAPs for functions is more difficult than feeding a protocol for an approximation into an SFE or an FHE scheme, the transformation provided by the PAP generator 110 shows there is still a generic compiler of an approximation protocol into a private one for a very large class of functions. While two parties are used here, the PAPs of embodiments of the present invention are also applicable to more than two parties.

The PAP generator 110 first transforms an approximation protocol into an FPA using an importance sampling procedure such as the g-Sampler protocol discussed below with respect to FIG. 3. The g-Sampler protocol is a protocol for two parties to privately obtain secret shares of a sample index i in {1, 2, . . . , n} or to obtain the symbol FAIL, such that the probability of obtaining a specific index i is equal to $$\frac{g(x_j, y_j)}{B},$$

where B is a known upper bound on $\Sigma_{j=1}^n g(x_j, y_j)$. In this context, "secret shares" mean that that the first party obtains i⊕XOR r and the second party obtains r, where r is a random bitstring, and so the parties do not know index i, though if their outputs are taken together, they determine i.

Given a protocol TPAP for (O(1/log n), ⅓)-approximating $\Sigma_{j=1}^n g(x_j, y_j)$, the PAP generator 110 first amplifies TPAP's success probability to 1−exp(−k) by independent repetition, taking the median. There is also an assumed public upper bound B on $\Sigma_{j=1}^n g(x_j, y_j)$ for all x and y. For problems considered in this discussion, one can take $B=(Mn)^{O(1)}$. This embodiment of the present invention designs an efficient method for two parties to sample from the distribution on [n]∪⊥:

$$\pi = \left( \frac{g(x_1, y_1)}{B}, \frac{g(x_2, y_2)}{B}, \ldots, \frac{g(x_n, y_n)}{B}, \frac{B - \sum_{j=1}^n g(x_j, y_j)}{B} \right),$$

where $$\pi(\bot) = \frac{B - \sum_{j=1}^n g(x_j, y_j)}{B}.$$

Some embodiments do not achieve a protocol sampling exactly from π, but they show how to sample from a distribution π' with $l_1$-distance exp(−k) from π, where k is a security parameter. The protocol starts by one party sending a seed of a pseudorandom generator to the other party, determining a pseudorandom string σ shared by both parties. This is the standard model, not the common reference string model.

A complete binary tree $\mathcal{T}$ is considered on n coordinates. A probability $r_i$ is assigned to each leaf i of $\mathcal{T}$ based on the execution of TPAP with random string σ as follows. Once σ is fixed, an approximation $a_{S_v}$ can be fixed for each subset $S_v \subseteq [n]$ of descendants of a node v in $\mathcal{T}$, namely $a_{S_v}$ is the output of TPAP on vectors x and y restricted to coordinates in the set $S_v$. To determine $r_i$ for a given i, consider the root-leaf path to i in $\mathcal{T}$, as well as the siblings $w_j$ of nodes $v_j$ along this path. Then, $r_i$ is the product of $$\frac{a_{S_{v_j}}}{a_{S_{v_j}} + a_{S_{w_j}}}$$

for each $(v_j, w_j)$ pair along this path. Since TPAP provides an (O(1/log n), exp(−k))-approximation, a telescoping product is obtained, and the following can be shown.

$$\frac{1}{2} \frac{g(x_i, y_i)}{\sum_{j=1}^{n} g(x_j, y_j)} \leq r_i \leq 2 \frac{g(x_i, y_i)}{\sum_{j=1}^{n} g(x_j, y_j)}$$

The concept is for the parties to perform a binary search on the coordinates of [n] by, starting from the root, applying TPAP independently on a node v and its sibling w, and choosing which node to recurse on based on the values $a_{S_v}$ and $a_{S_w}$. Namely, v is recursed on with probability $$\frac{a_{S_v}}{a_{S_v} + a_{S_w}},$$

otherwise w is recursed on. Upon reaching a single coordinate i, the value $g(x_i, y_i)$ is obtained by exchanging $x_i$ and $y_i$.

This embodiment uses the technique of rejection sampling, which is a technique to generate samples from a probability distribution function $f(z)$ by using a distribution $g(z)$, with the restriction that $f(z)<Vg(z)$, where V>1 for some bound V, and which is often easier to sample from than $f(z)$. This restriction cannot hold for all z since $f(z)$ and $g(z)$ are distributions; in this embodiment, the only z for which it will not hold is z=⊥. Rejection sampling is used to adjust the probability of outputting i so that it equals $$\frac{g(x_i, y_i)}{B}.$$

The probability to reject the sample i knowing $g(x_i, y_i)$ and computing $r_i$, and rejecting with probability $$\frac{g(x_i, y_i)}{Br_i},$$

can be determined. To do the rejection sampling, the probability, in this embodiment, is an overestimate of $$\frac{g(x_i, y_i)}{B}$$

with overwhelming probability, over the choice of σ, as otherwise this is not a valid probability, and the protocol is not simulatable. For correctness, this must hold even when $B \geq 2\Sigma_{j=1}^{n} g(x_j, y_j)$. Indeed, $$\frac{g(x_i, y_i)}{Br_i} \leq 1,$$

since $$r_i \geq \frac{1}{2} \cdot \frac{g(x_i, y_i)}{\sum_{j=1}^{n} g(x_j, y_j)} \geq \frac{g(x_i, y_i)}{B}.$$

If i is rejected, this probability mass contributes to $\pi'(\bot)$. Rejection sampling is only possible because embodiments zoom in on individual coordinates, for which the exact probability $$\frac{g(x_i, y_i)}{B}$$

can be efficiently computed.

Given the procedure of this embodiment, an information-truncation technique is leveraged. A coin is set to 1 if and only if (iff) the character ⊥ is not sampled by the importance sampling procedure of this embodiment. The local rejection probabilities in the protocol of this embodiment collectively add up, over the n coordinates, to the probability that the coin toss is 0. The coin has expectation $$\frac{\sum_{j=1}^{n} g(x_j, y_j)}{B}.$$

This is done independently for O*(1) coins. If most of the coins are 0, then B is halved and the process is repeated. This process of halving B depends only on the value $\Sigma_{j=1}^{n} g(x_j, y_j)$, so is simulatable. When B is close to $\Sigma_{j=1}^{n} g(x_j, y_j)$, with overwhelming probability a large fraction of coins will be 1, and $\Sigma_{j=1}^{n} g(x_j, y_j)$ can be (ε, δ)-approximated. In this embodiment application of the information-truncation technique is simpler because with importance sampling each coin toss involves all coordinates.

Transforming this FPA into a PAP can be done using FHE. However, if TPAP is a simultaneous protocol with shared randomness, the weaker assumption of symmetric computationally-private information retrieval (SPIR) with O*(1) communication and O*(n) work can be used. This is true for almost all applications of the illustrated embodiments of the present invention, which have sketching algorithms. In an SPIR protocol, there is a user with an index i∈[n]{1, 2, . . . , n} and a server with a string x∈{0, 1}$^n$ who execute a protocol for which the user learns only $x_i$, while a server learns nothing about i, assuming both parties must run in (n) time. A known construction coupled with a symmetric version satisfies this under the well-studied Φ-Hiding Assumption. If one is willing to lose a factor of $n^\gamma$ for arbitrarily small constant γ, one can just assume additively homomorphic encryption, for which there are many more schemes.

To perform the transformation of the FPA to a PAP based on SPIR, the seed is exchanged to generate σ in the clear. In contrast to σ, the randomness used to perform the binary search is unknown to the parties, and the traversal to a leaf i of $\mathcal{T}$, together with the computation of $r_i$, is done obliviously.

At a given level i in the tree, each party prepares a sketch for all possible $2^i$ internal nodes. Then SPIR can be used inside of a secure circuit ROM 111 to retrieve the sketches corresponding to the children of the current node in level i−1, combine the sketches, and choose which node to traverse in the sample according to the outputs of TPAP. In this way, the parties do not learn which nodes are traversed. Upon reaching a single coordinate i, the value $g(x_i, y_i)$ is obtained using SPIR, and secret-shared by the parties.

Transformation Protocol

FIG. 2 shows pseudo code 200 for performing the transformation process discussed above in accordance with one embodiment of the present invention. The illustrated pseudo code is for an operation performed by the PAP generator 110 for transforming a two-party protocol for a function $f(x, y)$ into a PAP. In the protocol of FIG. 2, inputs associated with a first entity, Alice, are $x \in \{0, 1, \ldots, M\}^n$ and k, and inputs associated with a second entity, Bob, are $y \in \{0, 1, \ldots, M\}^n$ and k as an input. The output of the operation shown in FIG. 2 is a private $(\epsilon, \delta)$-approximation protocol for $f(x, y) = \Sigma_{j=1}^n g(x_j, y_j)$. In step 1, B is a public upper bound on $f(x, y)$, for any possible inputs x, y. It is assumed that log $B = O^*(1)$. Let $l = O^*(1)$ be sufficiently large. In step 2, the following is repeated in the secure circuit ROM 111: (a) for $j \in [l]$, independently run g-Sampler $(x, y, 1^k)$, let the output be shares of $I_j \in [n] \cup \{\perp\}$; (b) independently generate l coin tosses $z_1, \ldots, z_l$, where $z_j = 1$ iff $I_j \neq \perp$; and (c) B=B/2. In step 2(b), if i=1 a coin is outputted which is 1 with probability of $$\frac{1}{p} \cdot \frac{f(a_{Choice} - b_{Choice})}{2M},$$

and is 0 otherwise. If $$\frac{1}{p} \cdot \frac{f(a_{Choice} - b_{Choice})}{2M} > 1,$$

abort and output fail. The entire procedure is repeated $$s = \frac{1}{\epsilon^2}$$

times, where $\epsilon$ in (0, 1) is an accuracy parameter, obtaining coins $C_1, \ldots, C_s$.

Step 3 shows that the process of FIG. 2 is performed until $$\sum_{j=1}^{l} z_j \geq \frac{l}{t}$$

or B<1, where t can be any value, such as 8 in this embodiment. Step 4 shows that the output is $$\Psi = \frac{2B}{\lambda} \sum_{j=1}^{l} z_j,$$

which is a private $(\epsilon, \delta)$-approximation protocol for $f(x, y) = \Sigma_{j=1}^n g(x_j, y_j)$. Using an alternative notation, $$\frac{2M}{s} \sum_{i=1}^{s} C_i$$

is outputted as an estimate to g(a, b).

Sampling Protocol

FIG. 3 shows pseudo code 300 for an operation performed by the PAP generator for a private implementation of an importance sampling procedure for transforming an approximation protocol into an FPA in accordance with one embodiment of the present invention. The illustrated pseudo code is for a g-Sampler protocol (called in step 2(a) of the transformation protocol of FIG. 2) that implements g-sampling functionality for simultaneous protocols TPAP. If TPAP is not a simultaneous protocol, the PAP generator 110 can instead implement the entire protocol using FHE. In the j-th iteration of step 2, the PAP generator 110, for each of Alice and Bob, only executes $$TPAP\left(\frac{n}{2^j}, \zeta, \delta\right)$$

on the left and right child, L and R, of q. By the properties of FHE, these values L and H are unknown to the parties.

As can be seen from FIG. 3, inputs associated with the first entity, Alice, are $x \in \{-M, \ldots, M\}^n$ and k, while inputs associated with the second entity, Bob, are $y \in \{-M, \ldots, M\}^n$ and k. Both parties are given an integer $B \geq 2 \Sigma_{j=1}^n g(x_j, y_j)$. With respect to the output, the PAP generator 110, for both entities, outputs a secret-sharing of a random $I \in [n] \cup \{\perp\}$ from a distribution statistically close to:

$$\forall i, Pr[I = i] = \frac{g(x_i, y_i)}{B},$$

and $$Pr[\perp] = -\sum_{j=1}^{n} \frac{g(x_j, y_j)}{B}.$$

In step 1, an initialization process is performed where $S = [n]$, $\delta = \exp(-k)$, $$\zeta = \Theta\left(\frac{1}{\log n}\right),$$

$\beta = 1$, and q to be a pointer to the root of a complete binary tree on n leaves. S is a simulator and is discussed below with respect to FIG. 4. Let G be a pseudorandom number generator (PRG) stretching $O^*(1)$ bits to $O^*(n)$ bits secure against (n)-sized circuits that can be evaluated in $O^*(n)$ time. Such G are implied by the assumption on SPIR. Alice sends Bob a seed γ to G, from which the parties share the random string $G(\gamma) = \sigma$.

In step 2, for j=1, 2, . . . , log n, in the j-th iteration, the following is performed. In sub-step 2(a), the PAP generator 110, for both Alice and Bob, breaks the coordinate set [n] into $$\frac{n}{2^j}$$

contiguous blocks of coordinates $x^1, \ldots, x^{2^j}$ and $y^1, \ldots, y^{2^j}$, respectively. In sub-step 2(b), the PAP generator 110, for both Alice and Bob, executes $$TPAP\left(\frac{n}{2^j}, \zeta, \delta\right)$$

on $x^l$ and $y^l$ for each $l \in [2^j]$, using $\sigma$ as the randomness for each execution. Let the resulting states of TPAP be $state_A(1)$, $state_A(2), \ldots, state_A(2^j)$ and $state_B(1), state_B(2), \ldots, state_B(2^j)$, the ROM tables of the parties.

For example, for j=1 and $x_1, \ldots, x_{n/2}$, the output of TPAP is $Out_a^1$ ($state_A(1)$), for j=1 and $x_{n/2+1}, \ldots, x_n$, the output of TPAP is $Out_a^2$ ($state_A(2)$), for j=1 and $y_1, \ldots, y_{n/2}$, the output of TPAP is $Out_b^1$ ($state_B(1)$), and for j=1 and $y_{n/2+1}, \ldots, y_n$, the output of TPAP is $Out_b^2$ ($state_B(2)$). For j=i (some value between 1, 2, . . . , log n) and $x_1, \ldots, x_{n/2}^i$, the output of TPAP is $Out_a^1$ ($state_A(1)$), for j=i and $x_{n/2+1}^i, \ldots, x_{2n/2}^i$ to $x_{n-n/2+1}^i, \ldots, x_n$, the output of TPAP is $Out_a^2$ ($state_A(2)$) and $Out_a^{2^i}$ ($state_A(2^j)$), respectively, for j=i (some value between 1, 2, . . . , log n) and $y_1, \ldots, y_{/2}^i$, the output of TPAP is $Out_b^1$ ($state_B(1)$), for j=i and $y_{n/2+1}^i, \ldots, y_{2n/2}^i$ to $y_{n-n/2+1}^i, \ldots, y_n$. the output of TPAP is $Out_b^2$ ($state_B(2)$) and $Out_b^{2^i}$ ($state_B(2^j)$), respectively.

In sub-step 2(c), the secure circuit ROM performs the following algorithm. In sub-step 2(c)(i), the secure circuit ROM 111 maintains the state of q internally (it is secret-shared between the two parties). In sub-step 2(c)(ii), the secure circuit ROM 111 views the set $[2^j]$ as the internal nodes in the j-th level of a complete binary tree, using SPIR to retrieve $state_A(L)$, $state_A(R)$, $state_B(L)$ and $state_B(R)$, where L and R are the left and right child of q, respectively. For example, when j=i (shown in the example above) private information retrieval is performed where the value of Choice from previous iteration is used to privately and efficiently retrieve $Out_a^{2*Choice-1}$, $Out_a^{2*Choice}$, $Out_b^{2*Choice-1}$, and $Out_b^{2*Choice}$.

In sub-step 2(c)(iii), the secure circuit ROM 111 combines $state_A(L)$ and $state_B(L)$ to obtain $$p_L = TPAP\left(\frac{n}{2^j}, \zeta, \delta\right)(x^L, y^L).$$

For example, L is set equal to $Out_a^1 - Out_b^1$ and $p_L$ is the estimator associated with TPAP on input L. In another example, L is set equal to $Out_a^{2*Choice-1} - Out_b^{2*Choice-1}$ and $p_L$ is the estimator associated with TPAP on input L. The secure circuit ROM 111 combines $state_A(R)$ and $state_B(R)$ to obtain $$p_R = TPAP\left(\frac{n}{2^j}, \zeta, \delta\right)(x^R, y^R).$$

For example, R is set equal to $Out_a^2 - Out_b^2$ and $p_R$ is the estimator associated with TPAP on input R. In another example, L is set equal to $Out_a^{2*Choice-1} - Out_b^{2*Choice-1}$ and $p_L$ is the estimator associated with TPAP on input L. R is set equal to $Out_a^{2*Choice} - Out_b^{2*Choice}$ and $p_R$ is the estimator associated with TPAP on input R. In sub-step 2(c)(iv), suppose first that $(p_L, p_R) \neq (0, 0)$. The secure circuit ROM 111 sets q to point to L with probability $$\frac{p_L}{p_L + p_R},$$

and otherwise sets q to point to R. In the first case it sets $$\beta = \beta \cdot \frac{p_L}{p_L + p_R}.$$

In the second case, the secure circuit ROM 111 sets $$\beta = \beta \cdot \frac{p_R}{p_L + p_R}.$$

If $(p_L, p_R) = (0, 0)$, the secure circuit ROM 111 outputs a pointer q to $\perp$ and $\beta$ remains the same. Using the first example discussed above, Choice set equal to 1 with probability of $$\frac{p_L}{p_L + p_R}$$

and 2 with probability $$\frac{p_R}{p_L + p_R}.$$

Using the second example discussed above, Choice is then set equal to 2*Choice-1 with probability of $$\frac{p_L}{p_L + p_R}.$$

In sub-step 2(c)(v), if j=log n, the secure circuit ROM 111 outputs a secret-sharing (e, f) of q and $\beta$ to the two parties.

In step 3, the PAP generator 110, for each of Alice and Bob, creates ROM tables for the entries of x and y, respectively. In step 4, the secure circuit ROM performs the following algorithm. In sub-step 4(a), the secure circuit ROM 111 uses inputs e and f to reconstruct q and $\beta$. If q points to $\perp$, the secure circuit ROM outputs a secret-sharing of $\perp$ to the two parties. Using the examples discussed above, Choice points to an index in $\{1, 2, \ldots, n\}$ and private information retrieval is used to obtain $x_{Choice}$ and $y_{Choice}$. Otherwise, in sub-step 4(b), the secure circuit ROM uses SPIR to retrieve $x_q$ and $y_q$, and computes $g(x_q, y_q)$. In other words, the state of the previous iterations is used to compute the probability p that the protocol sets Choice to the current value. In sub-step 4(c), the secure circuit ROM puts $$p = \frac{g(x_q, y_q)}{B \cdot \beta}.$$

If p>1, output fail. Otherwise, with probability p, the secure circuit ROM, in sub-step 4(d), outputs a secret sharing of q to the two parties, else output a secret sharing of ⊥. In other words, a coin is outputted which is 1 with probability of $$\frac{f(x, y)}{M},$$

and is 0 otherwise. If $$\frac{f(x, y)}{M} > 1,$$

abort and output fail. In step 5, the entities output the output of the secure circuit evaluation in step 4.

Thus, the PAP generator 110 transforms any two-party protocol for approximating a function $f(x, y)$ of the form $f(x, y) = \Sigma_{j=1}^{n} g(x_j, y_j)$, for any non-negative efficiently computable function g, into a PAP for $f(x, y)$ with the same communication, computation, and round complexity, up to an O*(1) factor (the computation also increases by an additive O*(n)).

In one embodiment, the parties run in O*(n) time with respect to the protocols of FIGS. 2 and 3. It can be assumed that $\epsilon > 1/(n)$, as otherwise it would become more efficient to compute $Out_a^1$ exactly using known secure function evaluation techniques. The security parameter k is polylog (n) or $n^\gamma$ for arbitrarily small constant $\gamma > 0$. To say the parties run in $(nk^{-1})$ time is thus equivalent to say the parties run in (n) time. It can be assumed, without loss of generality, that both parties are semi-honest, meaning they follow the protocol, but may keep message histories in an attempt to learn more than what is prescribed. It is known how to transform a semi-honest protocol into a protocol secure in the malicious model, at the cost of at most an O*(1) factor.

A function h' is functionally private with respect to a function h if there is an (n)-time simulator S for which for any input x, {S(h(x))}{h'(x)}. The illustrated embodiment defines a private approximation protocol of a function h. A two-party private ($\epsilon$, $\delta$)-approximation protocol of h is a private protocol that computes a randomized mapping $\hat{h}$ satisfying the following two properties: 1) $\hat{h}$ is functionally private for h, and 2) $\hat{h}$ is an ($\epsilon$, $\delta$)-approximation of h.

It can be assumed, without loss of generality, that n is a power of 2. First, the importance sampling with regard to g is defined. In the g-sampling functionality, both parties receive integers B and k, as discussed above with respect to FIG. 3. Alice receives an input $x \in \{-M, -M+1, \ldots M\}^n$, while Bob receives an input $y \in \{-M, -M+1, \ldots, M\}^n$. It is promised that $B \geq 2\Sigma_{j=1}^n g(x_j, y_j)$. Define $$\pi = \left( \frac{g(x_1, y_1)}{B}, \frac{g(x_2, y_2)}{B}, \ldots, \frac{g(x_n, y_n)}{B}, \frac{B - \sum_{j=1}^{n} g(x_j, y_j)}{B} \right),$$

where $$\pi(\perp) = \frac{B - \sum_{j=1}^{n} g(x_j, y_j)}{B}.$$

The output is a secret-sharing of a random $I \in [n] \cup \{\perp\}$ from a distribution $\pi'$ with $\|\pi' - \pi\|_1 \leq \exp(-k)$. Throughout, TPAP (n', $\epsilon'$, $\delta'$) is a protocol for ($\epsilon'$, $\delta'$)-approximating $\Sigma_j g(x_j, y_j)$ on n' coordinates. Suppose TPAP has r(n', $\epsilon'$, $\delta'$) rounds, c(n', $\epsilon'$, $\delta'$) total communication, and t(n', $\epsilon'$, $\delta'$) total time. The importance sampling procedure provided by the protocol of FIG. 3 works for any, neither unbiased nor sharply concentrated, efficient protocol TPAP, which is capable of providing an (O(1/log n), ⅓)-approximation.

It will now be shown that for $\zeta = \Theta(1/\log n)$, the g-Sampler protocol correctly implements g-sampling functionality. Let I be the value secret-shared by the two parties upon termination of the protocol. It needs to be shown that I is sampled from a distribution $\pi'$ that has $l_1$ distance exp(-k) from $\pi$. Consider the complete binary tree $\mathcal{T}$ on coordinate set [n], and consider the 2n−1 subsets $S_v$ associated with nodes v of $\mathcal{T}$. Since $\delta = \exp(-k)$, by a union bound, for any subset $S_v$ of coordinates associated with a node v of $\mathcal{T}$, TPAP on vectors x, y restricted to coordinates in $S_v$ succeeds in providing a (1±ζ)-approximation with probability at least 1−(2n−1)exp(−k)=1−exp(−k). Let the random string σ used by the protocol be fixed, and condition on the event $\epsilon$ of it having this property. The protocol does not actually invoke TPAP on all subsets $S_v$, though it is assumed it is correct on all such $S_v$.

Fixing σ, all invocations of TPAP become deterministic, and so for each node $v \in \mathcal{T}$, there is a well-defined probability $r_v$, over the coin tosses of the binary search in step 2(c)(iv) that the protocol reaches node v. Namely, suppose v is at shortest path distance l from the root $v_0$ of $\mathcal{T}$. Let $v_0, v_1, v_2, \ldots, v_l = v$ be the unique path from the root of $\mathcal{T}$ to v. Let $w_1, w_2, \ldots, w_l$ be the siblings of $v_1, v_2, \ldots, v_l$, respectively. Then, $$r_v = \prod_{i=1}^{l} \frac{p_{v_i}}{p_{v_i} + p_{w_i}},$$

where the $p_{v_i}$ are as defined in step 2(c)iii. Notice that, if the denominator is 0, then the numerator is also 0, and in this case this probability is 0.

Since it conditions on event $\epsilon$, using the non-negativity of g, a telescoping is obtained:

$$r_v = \prod_{i=1}^{l} \frac{p_{v_i}}{p_{v_i} + p_{w_i}} \leq$$

$$\frac{(1+\zeta)^l}{(1-\zeta)^l} \prod_{i=1}^{l} \frac{\sum_{j \in S_{v_i}} g(x_j, y_j)}{\sum_{j \in S_{v_i}} g(x_j, y_j) + \sum_{j \in S(w_i)} g(x_j, y_j)}$$

$$= \frac{(1+\zeta)^l}{(1-\zeta)^l} \cdot \frac{\sum_{j \in S_v} g(x_j, y_j)}{\sum_{j=1}^{n} g(x_j, y_j)} \leq$$

-continued $$(1 + \Theta(\zeta l)) \frac{\sum_{j \in S_v} g(x_j, y_j)}{\sum_{j=1}^{n} g(x_j, y_j)}$$

$$\leq 2 \cdot \frac{\sum_{j \in S_v} g(x_j, y_j)}{\sum_{j=1}^{n} g(x_j, y_j)}.$$

for a small enough $\zeta = \Theta(1/\log n)$.

An analogous argument shows also that $$r_v \geq \frac{1}{2} \cdot \frac{\sum_{j \in S_v} g(x_j, y_j)}{\sum_{j=1}^{n} g(x_j, y_j)}.$$

Notice that these bounds on $r_v$ also hold if $\Sigma_{j \in S_v} g(x_j, y_j) = 0$. Now, in step 4(c), $B \geq 2\Sigma_{j=1}^{n} g(x_j, y_j)$, so $$p \leq \frac{g(x_q, y_q)}{2\beta \sum_{j=1}^{n} g(x_j, y_j)}.$$

But $\beta = r_q$ for a leaf $q \in \mathcal{T}$, and by the above $$r_q \geq \frac{1}{2} \cdot \frac{g(x_q, y_q)}{\sum_{j=1}^{n} g(x_j, y_j)},$$

and so $p \leq 1$. Hence, a fail is not outputted in step 4(c). It follows, for the fixed choice of σ, that the probability coordinate I=i is outputted is $$r_i \cdot \frac{g(x_i, y_i)}{B r_i} = \frac{g(x_i, y_j)}{B}.$$

Since there is a distribution, for fixed σ, it follows that $$Pr[I = \perp] = 1 - \frac{\sum_{j=1}^{n} g(x_j, y_j)}{B}.$$

Event ε occurs with probability $1-\exp(-k)$, and the above holds for any choice of σ for which ε occurs.

It will now be shown that the g-Sampler protocol can be implemented in $O^*(c(n, \zeta, 1/3))$ communication, a total of $O^*(t(n, \zeta, 1/3)+n)$ time, and $O^*(r(n, \zeta, 1/3))$ rounds. In an embodiment where TPAP is a simultaneous protocol, there are log n iterations of step 2. In the j-th iteration, both parties invoke TPAP $2^j$ times on inputs of size $n/2^j$ to achieve a $(\zeta, \exp(-k))$-approximation. Here, $c(n, \zeta, \delta) = O(k) \cdot c(n, \zeta, 1/3)$, $t(n, \zeta, \delta) = O(k) \cdot t(n, \zeta, 1/3)$, and $r(n, \zeta, \delta) = O(k) \cdot r(n, \zeta, 1/3)$, since TPAP may be independently repeated $O(\log 1/\delta)$ times and then calculate the median of its outputs.

Step 3 and step 4 of the g-Sampler protocol shown in FIG. 3 can be done in $O^*(1)$ communication, $O^*(n)$ time, and $O(1)$ rounds, given the assumption of an efficient SPIR protocol. Assuming an efficient SPIR protocol, used to retrieve each bit of the state of TPAP, the total communication is $O^*(1) \cdot \Sigma_{j=1}^{\log n} c(n2^{-j}, \zeta, 1/3) = O^*(c(n, \zeta, 1/3))$. Moreover, assuming an efficient SPIR protocol, the total number of rounds is $O^*(1) \cdot \Sigma_{j=1}^{\log n} r(n2^{-j}, \zeta, 1/3) = O^*(r(n, \zeta, 1/3))$. The total time is $O^*(n) + \Sigma_{j=1}^{\log n} 2^j \cdot t(n2^{-j}, \zeta, 1/3)$. If $t(n', \zeta, 1/3) = \tilde{\Omega}(n')$, then this sum can be upper bounded by $O^*(t(n, \zeta, 1/3))$. Otherwise, the additive $O^*(n)$ dominates.

For the embodiment where TPAP is a general protocol, the entire g-Sampler protocol can be implemented using FHE. In the j-th iteration of step 2 of the g-Sampler protocol shown in FIG. 3, Alice and Bob will only execute $$TPAP\left(\frac{n}{2^j}, \zeta, \delta\right)$$

on the left and right child, L and R, of q. Since FHE only increases communication, round, and time complexities by a $O^*(k)$ factor (assuming the original time complexity is at least linear), this completes the proof.

It will now be shown that Main protocol of FIG. 2 is a PAP for $\Sigma_{j=1}^{n} g(x_j, y_j)$, i.e., an (ε, δ)-FPA, and a private protocol with $O^*(c(n, \zeta, 1/3))$ communication, $O^*(t(n, \zeta, 1/3)+n)$ time, and $O^*(r(n, \zeta, 1/3))$ rounds. First it is shown that Main outputs an (ε, exp(-k))-approximation of $\Sigma_{j=1}^{n} g(x_j, y_j)$. Observe that since the g-Sampler protocol correctly implements g-sampling functionality for $\zeta = \Theta(1/\log n)$, then in any iteration and for any $j \in [l]$, $$E[Z_j] = (1 \pm \exp(-k)) \frac{\sum_{j=1}^{n} g(x_j, y_j)}{B}.$$

Since B is halved in step 2c, by linearity of expectation, $E[\Psi] = \Sigma_{j=1}^{n} g(x_j, y_j)$. For the concentration, with probability $1-\exp(-k)$, if $B \geq \Theta(k) \cdot \Sigma_{j=1}^{n} g(x_j, y_j)$, then $$\sum_{j=1}^{l} z_j < \frac{l}{8}.$$

On the other hand, if $B = O(k) \cdot \Sigma_{j=1}^{n} g(x_j, y_j)$, then for sufficiently large $l = O^*(1)$, by a Chernoff bound:

$$Pr\left[\left|\sum_{j=1}^{l} z_j - E\left[\sum_{j=1}^{l} z_j\right]\right| > E\left[\sum_{j=1}^{l} z_j\right]\right] \leq \exp(-k),$$

and by a union bound one can assume this holds for all such values of B. If $\Sigma_{j=1}^{n} g(x_j, y_j) = 0$, Main outputs 0. Else, there is a B for which $$E\left[\sum_{j=1}^{l} z_j\right] \geq \frac{l}{4},$$

it follows that in step 3

$$\sum_{j=1}^{l} z_j \geq \frac{l}{8},$$

and this sum provides a (1±ϵ)-approximation to $$E\left[\sum_{j=1}^{l} z_j\right] = \frac{l}{2B} \sum_{j=1}^{n} g(x_j, y_j)$$

with probability 1−exp(−k).

Now it will be shown that Main is functionally private. As can be seen from the exemplary pseudo code 400 of FIG. 4, the simulator S is given $f(x, y)$. In step 2, B is an upper bound on $f(x, y)$, for any possible inputs x, y. An assumption is made that log B=O*(1). Let l=O*(1) be sufficiently large. In step 2, the following is repeated: (a) for j∈[l], generate l independent coin tosses $z_j$ with bias $$\frac{f(x, y)}{B};$$

and (b) B=B/2. In step 4, the above process is performed until $$\sum_{j=1}^{l} z_j \geq \frac{l}{8}$$

or B<1. In step 4, the output is $$\Psi' = \frac{2B}{l} \sum_{j=1}^{l} z_j.$$

The probabilities $z_j$=1 in the simulated and the real view differ only by a factor of 1±exp(−k). It follows that the distributions of Ψ and have Ψ' have $l_1$-distance exp(−k), which completes the proof.

Next it will be shown that the protocol is private and efficient and that Main satisfies the requirements of the definition given above with respect to a private two-party protocol Π of a randomized mapping h. The first part follows from the above. Based on the discussion above with respect to the g-Sampler protocol privately implementing the g-sampling functionality and the discussion with respect to a private oracle-aided protocol for h, the calls to g-Sampler can be replaced with an oracle functionality. Based on the discussion above with respect to a PIR (and hence an SPIR) scheme with C(n)=O*(n), the functionality in step 2 can be implemented privately. For efficiency, there is only an O*(1) overhead in each of these measures from that of protocol g-Sampler, so the lemma follows from the above discussion with respect to the g-Sampler protocol being implemented in O*(c(n, ζ, ⅓)) communication.

Accordingly, embodiments of the present invention provide private approximation protocols (PAPs) for various approximation functions For example, one embodiment provides the following general transformation: any two-party protocol for outputting a (1+ϵ)-approximation to $f(x, y)=\sum_{j=1}^{n} g(x_j, y_j)$ with probability of at least ⅔, for any non-negative efficiently computable function g, can be compiled, via the PAP generator, into a two-party private approximation protocol with only a polylogarithmic factor loss in communication, computation, and round complexity. In general it is insufficient to use secure function evaluation or fully homomorphic encryption on a standard, non-private protocol for approximating f. This is because the approximation may reveal information about x and y that does not follow from $f(x, y)$.

FIG. 5 shows a table 500 summarizing various exemplary results that have been achieved with the transformation (and its variations) provided by the PAP generator. Optimal PAPs are obtained, up to O*(1) factors, for $l_p$-distances, $l_p$-heavy hitters, and $l_p$-sampling for any p≥0, entropy, max-dominance and other dominant $l_p$-norms, distinct summation, cascaded moments, subspace approximation, block sampling, and measuring $l_2$-independence of datasets. Except for subspace approximation and block sampling, the only assumption is SPIR with O*(1) communication and O*(n) computation. For subspace approximation and block sampling, FHE is used. The same bounds hold in the multi-party setting for any O*(1) parties.

In FIG. 5, CC-non-private (f) denotes the non-private O*(1)-round randomized communication complexity of (O(1/log n), ⅓)-approximating f. A value is near-optimal if it is optimal up to a O*(1) factor. A PAP is near-optimal if its communication, computation, and round complexity are simultaneously optimal up to an O*(1) factor. For all problems above, near-optimal PAPs are obtained. In the exemplary two-party protocols, the two parties are named Alice and Bob. For the sake of exposition, PAPs are sometimes described as FPAs, mentioning any subtleties that are needed to implement the FPA as a PAP using SPIR.

The following are various examples of how the transformation discussed above can be applied. The first example is with respect to $l_p$-Distances. Combining the above transformation with $l_p$-estimation algorithms, for $g(x_j, y_j)=|x_j-y_j|^p$ near-optimal $O*(n^{1-2/p})$ communication, O*(n) computation, and O*(1) round PAPs for the $l_p$-distance, p>2, as well as a near-optimal O*(1) communication, O*(n) computation, and O*(1) round PAP for the $l_0$-distance are obtained. No sublinear communication PAPs were known for these problems.

Even though PAPs or FPAs are known for p∈(0, 2], the framework of embodiments of the present invention has several advantages. One is that the transformation avoids some rounding issues of real numbers needed to ensure FPA in previous works; in one embodiment the parties can compute $g(x_i, y_i)$ to arbitrary precision after communicating $x_i$ and $y_i$, where i is the coordinate sampled by the importance sampling procedure. Another advantage is that embodiments of the present invention transform any protocol for $l_p$ into a PAP, making new tradeoffs possible. Embodiments of the present invention can use protocols more suitable for inputs given as a list of ranges, with faster update time, or that use less randomness. For example, one embodiment improves the update time for $l_2$ by a factor of k using a known algorithm with ϵ=1/log n (to do binary search), while for p∈(0, 2) one embodiment improves by a factor of k/(loglog n) using a known algorithm. The communication of one embodiment is a factor of $\log^2 n/k$ times that of a known algorithm.

The following example is with respect to heavy hitters and compressed sensing. Letting z=x−y, one embodiments want an r-sparse vector $\tilde{z}$ with $\|z-\tilde{z}\|_p^p \leq (1+\epsilon)\|z-z_{opt}\|_p^p$, where $z_{opt}$ is an r-sparse vector minimizing $\|z-z_{opt}\|_p^p$. It is known that if only $z_{opt}$ is leaked, then Ω(n) communication is required. The problem is relaxed by allowing $\|z\|_2$ to also be leaked, and it is known how to near-optimally solve the heavy hitters problem for $p\in\{1, 2\}$ in this case.

Plugging the private $l_p$ protocols of one embodiment into the main protocol of a known algorithm, this embodiment improves this by showing how to near-optimally solve the problem of finding $\tilde{z}$ with $\|\tilde{z}-z\|_p^p \leq (1+\epsilon)\|z_{opt}-z\|_p^p$ 1 eaking $z_{opt}$ and $\|z\|_p^p$ for every $p\geq 0$. If $p\in[0, 2]$, the communication is $O^*(1)$, while if $p>2$ the communication is $O^*(n^{1-2/p})$, which is required. The information this embodiment leaks is more natural than that leaked in the known algorithm, which for p=1 leaks $\|z\|_2$ and $\tilde{z}$ rather than $\|z\|_1$ and $\tilde{z}$, the latter being equivalent to leaking $\|z-\tilde{z}\|_1$ and $\tilde{z}$, the error incurred by the sparse representation. One minor point is that the one embodiment needs a non-private near-optimal heavy-hitters protocol for every $l_p$.

Another example is with respect to general similarity measures. While the transformation of one embodiment gives near-optimal PAPs for any function of the form $f(x, y)=\Sigma_{j=1}^n g(x_j, y_j)$, for non-negative g, one may want to know for which g the one embodiment obtains PAPs with $O^*(1)$ computation, $O^*(n)$ computation, and $O^*(1)$ rounds. For this, the one embodiment uses a known theorem, which says the following for functions $g(x_j, y_j)=h(x_j-y_j)$. Define $\pi_\epsilon(x)$ with respect to h, for $\epsilon>0$, as $\pi_\epsilon(x)=\min\{x, \min\{|z|\in\mathbb{N}^+ : |h(x)-h(x+z)|>\epsilon h(x)\}\}$. Then a function h is tractable if $h(1)>0$ and $\forall k, \forall N_0 \exists t \forall x, y\in \mathbb{N}^+, \forall R\in\mathbb{R}^+ \forall \epsilon$:

$$\left(R>N_0, \frac{h(x)}{h(y)}=R, \varepsilon > \frac{1}{\log^k(Rx)}\right) \to \left(\left(\frac{\pi_\epsilon(x)}{y}\right)^2 \geq \frac{R}{\log^t(xR)}\right).$$

This intuitively corresponds to functions h(x) that grow slower than $x^2$. If h is tractable, h(0)=0, h is non-decreasing on $\mathbb{R}^{\geq 0}$, and h(x)=h(-x), then h can be computed in $O^*(1)$ space and 1-pass in a data stream. Assuming h can be computed in $O^*(1)$ time, the total time is also $O^*(n)$. It was observed that the known algorithm computes a linear sketch, thereby defining a sketching protocol, and via the transformation of one embodiment of the present invention, the first, and in fact near-optimal, PAP for any such h, which includes functions as bizarre as $h(x)=(x(x+1))^{0.5\ \arctan(x+1)}$. There is nothing close to an NBE for these problems, much less a sharply concentrated one.

An additional example is with respect to max-dominance norm, dominant $l_p$-norms, and distinct summation. The Max-Dominance Norm is useful in financial applications and IP network monitoring. Alice has $x\in\{0, 1, \ldots, M\}^n$, Bob has $y\in\{0, 1, \ldots, M\}^n$, and the max-dominance norm is $\Sigma_{j=1}^n \max(x_j, y_j)$. This problem, and its generalization, the dominant $l_p$-norm $(\Sigma_{j=1}^n \max(x_j, y_j)^p)^{1/p}$ for $p>0$ have been studied. There are no sharply concentrated NBEs known for $p>0$. For example, the estimators Z are distributed as p-Fréchet, which, if the dominant $l_p$-norm is c, have $\Pr[Z>z]=1-\exp(-c^p z^{-p})$. For $p\leq 1$, there is no expectation, while for general p these are heavy-tailed, so there is a non-negligible (1/(n)) probability of observing a value that is (n) times c. Nevertheless, the known algorithms give $(\epsilon, \delta)$-approximations for these problems in $O^*(1)$ space, and by the transformation of one embodiment of the present invention, near-optimal PAPs are obtained. The one embodiment also gets a near-optimal PAP for the related distinct summation problem in sensor networks, which also does not have a sharply concentrated NBE. Here, for each $j\in[n]$ there is a $v_j\in\{1, \ldots M\}$ and Alice has either $(j, v_j)$ or $(j, 0)$, while Bob has either $(j, v_j)$ or $(j, 0)$. The problem is to compute $\Sigma_{distinct(j, v_j)} v_j$, for each j, either the value $v_j$ or 0 contributes to the sum.

The next example is with respect to entropy with relative error. Entropy $$H(x, y) = \sum_{i=1}^n \frac{x_i + y_i}{\sum_{j=1}^n x_j + y_j} \cdot \log \frac{\sum_{j=1}^n x_j + y_j}{x_i + y_i}$$

is defined for inputs x, y with $(x+y)_i \in \mathbb{R}^{\geq 0}$ for all $i\in[n]$. Here, if $x_i+y_i=0$, $$0\log\frac{1}{0}$$

is interpreted as 0. The variables $x_i$ or $y_i$ are allowed to be negative, but require their sum to be non-negative. This is the strict turnstile model in streaming, for which entropy is well-studied, and sketching algorithms with relative error, $O^*(1)$ space and update time are known. There are no known NBEs concentrated enough to achieve relative error. The natural NBE is to sample a coordinate i with probability $$\frac{x_i + y_i}{\sum_{j=1}^n x_j + y_j}$$

and output $$\log \frac{\sum_{j=1}^n x_j + y_j}{x_i + y_i}.$$

However, while the estimator is unbiased, the concentration is poor and can only be used to achieve additive error. One embodiment of the present invention achieves relative error. H(x, y) is not in the class of functions handled by the transformation of the one embodiment. The crucial observation is that for any parameter $T\geq \Sigma_{j=1}^n x_j+y_j$, the function $$H_T(x, y) = \sum_{i=1}^n \frac{x_i + y_i}{T} \cdot \log \frac{T}{x_i + y_i}$$

also has an efficient relative error algorithm, given the values T and $\Sigma_{j=1}^n x_j+y_j$. Indeed, the one embodiment runs an efficient algorithm for H(x, y), gets $\hat{H}$, and outputs $$\frac{\sum_{j=1}^n x_j + y_j}{T} \cdot \hat{H} + \frac{\sum_{j=1}^n x_j + y_j}{T} \cdot \log\left(\frac{T}{\sum_{j=1}^n x_j + y_j}\right).$$

The additive error is at most $$\varepsilon \cdot \frac{\sum_{j=1}^{n} x_j + y_j}{T} H(x, y) =$$

$$\varepsilon \sum_{i=1}^{n} \frac{x_i + y_i}{T} \cdot \log \frac{\sum_{j=1}^{n} x_j + y_j}{x_i + y_i} \leq \sum_{i=1}^{n} \frac{x_i + y_i}{T} \cdot \log \frac{T}{x_i + y_i} = \varepsilon H_T(x, y).$$

The one embodiment fixes $T = \sum_{j=1}^{n} x_j + y_j$ and in recursive calls in the binary search uses the same value of T rather than $\sum_{j \in S} x_j + y_j$ for the set S under consideration (so the one embodiment recursively computes $H_T$ rather than H). In the outer level of recursion, $H(x, y) = H_T(x, y)$, and $H_T$ has the form of the transformation, so the one embodiment gets a PAP for $H(x, y)$ with relative error. The one embodiment does not need FHE, since $\sum_{j=1}^{n} x_j + y_j$ can be obtained using SFE.

Another example is with respect to $l_p$-sampling and cascaded moments, with applications. An important primitive is to return a sample according to the distribution π, which is used for purposes other than estimating $\sum_{j=1}^{n} g(x_j, y_j)$. This is useful for cascaded moments, earthmover distance, and non-bipartite matching, as well as machine learning problems such as classification and minimum enclosing ball (here $g(z) = z^2$), and forward sampling in a database. There are no known NBEs for any of these problems, much less sharply concentrated ones. The importance sampling procedure of embodiments of the present invention directly and near-optimally solves this sampling primitive privately.

As an example application, it is known to estimate the cascaded moment $F_q(F_p(A))$ of a n×d matrix A, defined as $\sum_{i=1}^{n} (\sum_{j=1}^{d} |A_{i,j}|^p)^q$, for integers q, p and give a near-optimal $O^*(n^{1-2/(qp)} d^{1-2/p})$ space algorithm for integers $q \geq p \geq 2$. It is also known how to achieve near-optimal space for $q=1$ and any p, and near-optimal space for $F_q(P)$ for any q. To obtain a PAP, one embodiment of the present invention first uses the importance sampling procedure to sample a row $A_i$ with probability $$r_i = C \cdot \frac{F_q(F_p(A_i))}{B},$$

for a constant $C > 1$ and an upper bound B on $F_q(F_p(A))$. The crucial observation is that $F_q(F_p(A)) = \Pi_{j_1, \ldots, j_q} |A_{i,j_i}|^p$, so it would suffice to sample independently a total of q times to obtain entries $A_{i,j_1}, \ldots, A_{i,j_q}$ with probability proportional to their p-th power, i.e., $(i, j_1), \ldots, (i, j_q)$ is sampled with probability $$\frac{|A_{i,j_1} \ldots A_{i,j_q}|^p}{F_q(F_p(A_i))}.$$

However, the one embodiment cannot do this in a black box fashion, since it needs an approximation s to the probability (i, $j_1), \ldots, (i, j_q)$ is sampled to then compute $|A_{i,j_1} \ldots A_{i,j_q}|^p$ exactly; so it can compute $$r \cdot s = C' \cdot \frac{|A_{i,j_1} \ldots A_{i,j_q}|^p}{B},$$

for a constant C' it can ensure is at least 1; and then do rejection sampling to output a coin with bias $$\frac{F_q(F_p(A))}{B}.$$

Using the information-truncation technique, the one embodiment thus obtains a PAP with only an $O^*(1)$ overhead.

Yet a further example is given with respect to subspace approximation and sampling blocks. Approximating a point set by a subspace is known in the linear algebra field. The particular form considered is in the form of regression, and in the form of approximation to a fixed subspace. In the setting of one embodiment of the present invention, Alice has n×d matrix A, Bob has n×d matrix B, and C=A+B, representing n records each with d attributes. They want to secret share a core-set, i.e., a small weighted subset of rows of C so that later, for any fixed j-dimensional subspace F of $\mathbb{R}^d$, cost(C, $F) = \sum_{i=1}^{n} dist(C_i, F)$ can be $(1+\epsilon)$-approximated from the core-set with functional privacy and probability $1 - \exp(-k)$. Here, dist is $l_2$-distance of a point to a subspace.

One embodiment first reviews a core-set construction, where the main algorithms are DimReduction and Adaptive-Sampling. Assume the dimension j of the query subspace is constant. It is known how to efficiently obtain an O(1)-approximation $D^j$ to the best j-subspace using approximate volume sampling. Then, $r = O(\epsilon^{-2} \log 1/\delta)$ samples $s_1, \ldots, s_r$ drawn with replacement from C, where $$Pr[C_i] = \frac{dist(C_i, D^j)}{cost(C, D^j)}.$$

Point $s_i$ is assigned weight $$\frac{1}{Pr[s_i]}.$$

For each $s_i$, let $s_i' = proj(s_i, D^j)$, the projection of $s_i$ onto $D^j$, which is assigned a weight of $$-\frac{1}{Pr[s_i]}.$$

Finally, all points are projected onto $D^j$. In recursive steps, an O(1)-approximation $D^{j-1}$ to the best j-1-subspace of proj(C, $D^j$) is found, and the above sampling procedure is repeated. The recursion stops when all points are projected to the origin. The weighted core-set is the union of the $s_i$ and $s_i'$ over the j+1 stages. It has been shown that for any fixed subspace F, the sum of (weighted) distances of core-set points to F is an unbiased estimator of cost(C, F) and is an $(\epsilon, \delta)$-approximation.

While some embodiments of the present invention have an NBE, and in this case making $\delta = \exp(-k)$, a sharply concentrated one, the obstruction is that there is no way of implementing the NBE in a communication-efficient manner Indeed, even obtaining an approximation to each $\|C_i\|_2$ required $\Omega(n)$ communication, and it is unclear how to use these to obtain an NBE for subspace approximation. First the PAP of one embodiment is described assuming additively homomorphic encryption, which achieves $O^*(d^2)$ communication, $O^*(nd)$ work, and $O^*(1)$ rounds. Then it is shown how to reduce the communication to near-optimal $O^*(d)$ assuming FHE.

Consider the quantity $F_1(l_2(C)) = \sum_{i=1}^{n} \|C_i\|_2$. One embodiment uses the same approach as for cascaded moments to first sample a row $C_i$ with probability $$\frac{\|C_i\|_2}{F_1(l_2(C))},$$

using that an $O^*(1)$-communication and $O^*(nd)$-computation protocol for $(\epsilon, \delta)$-approximation to $F_1(l_2)$ exists. Now $\|C_i\|_2$ cannot be expressed as a low-degree polynomial, but the one embodiment uses SPIR to retrieve $A_i$, $B_i$, then compute $\|C_i\|_2$ exactly with $O^*(d)$ communication, which allows rejection sampling to be done to output a coin with bias $$\frac{F_1(l_2(C))}{B}$$

for an upper bound B. One embodiment repeatedly halves B until a sample $C_{i_1}$, i.e., until a reject does not occur, is obtained. Then $C_{i_1}$ is sampled with probability $$\frac{\|C_i\|_2}{\sum_{i=1}^{n} \|C_i\|_2},$$

and is additively shared. An SFE computes the d×d projection matrix $P_1$ corresponding to $C_{i_1}$, and sends the parties an additively homomorphic encryption $E(I-P_1)$, where I is the d×d identity matrix. The parties compute $E(A \cdot (I-P_1))$ and $E(B \cdot (I-P_1))$ using the homomorphism. The second crucial observation is that the known sketch is a linear map, so it can be applied to the encryptions of the new points. One embodiment of the present invention repeats this process, the SFE obtains $C_{i_1}$, $C_{i_2}$, and computes a homomorphic encryption of $I-P_2$, where $P_2$ is the projection onto span $\{C_{i_1}, C_{i_2}\}$, and the parties compute $E(A \cdot (I-P_2))$ and $E(B \cdot (I-P_2))$. The process repeats until the points are homomorphically encrypted on the orthogonal complement of $D^j$. The parties also compute homomorphic encryptions of the projections of their points onto $D^j$.

Given this implementation of approximate volume sampling, implementing a known algorithm can again be done by sampling a homomorphically encrypted row according to its $l_2$ norm (these rows are now normal and projection vectors). Inductively, the entire procedure of the known algorithm can be implemented this way. Setting $\delta = \exp(-k)$, one embodiment of the present invention gets a sharply concentrated NBE. The critical use of the transformation of the one embodiment was to privately obtain a sample according to its $l_2$-norm in an unbiased way. The PAP of the one embodiment generalizes to sampling rows (blocks) according to any norm (not just $l_2$).

To achieve communication $O^*(d)$, note that the projection matrices $P_i$ have rank at most j, so can instead be communicated using FHE with $O^*(d)$ bits. There is an $\Omega(d)$ lower bound, which follows even to store a core-set consisting of a single point.

A further example is given with respect to $l_2$-distance to independence of datasets. In the streaming version of the problem: Alice has $(i, j, a_{i,j}) \in [n]^2 \times \{0, 1, \ldots, M\}$, and Bob has $(i, j, b_{i,j}) \in [n]^2 \times \{0, 1, \ldots, M\}$. Define the joint probabilities $$p_{i,j} = \frac{a_{i,j} + b_{i,j}}{\sum_{i',j'} a_{i',j'} + b_{i',j'}},$$

and marginals $$q_i = \frac{\sum_{j'} a_{i,j'} + b_{i,j'}}{\sum_{i',j'} a_{i',j'} + b_{i',j'}} \text{ and } r_j = \frac{\sum_{i'} a_{i',j} + b_{i',j}}{\sum_{i',j'} a_{i',j'} + b_{i',j'}}.$$

This obtains an $(\epsilon, \delta)$-approximation for $h(a, b) = \sum_{i,j} (p_{i,j} - q_i r_j)^2$ in $O^*(1)$ space in $O^*(n^2)$ time. The algorithm chooses independent 4-wise independent vectors $u, v \in \{-1, +1\}^n$, maintains $s = \sum_{i,j} u_i v_j (a_{i,j} + b_{i,j})$, $t_1 = \sum_i u_i \sum_j (a_{i,j} + b_{i,j})$, $t_2 = \sum_j v_j \sum_i (a_{i,j} + b_{i,j})$, and L, and computes $$\left( \frac{s}{L} - \frac{t_1 t_2}{L^2} \right)^2.$$

It averages out $O(\epsilon^{-2})$ independent copies, and takes the median of $O(\log 1/\delta)$ independent averages. The algorithm is not an NBE due to the median operation.

To obtain a PAP, one embodiment of the present invention combines the techniques used for entropy and cascaded moments. First, the one embodiment treats q, r, and $L = \sum_{i',j'} a_{i',j'} + b_{i',j'}$ as fixed, coming from the outer level of recursion. Define $$h(a, b, q, r, L) = \sum_{i,j} \left( \frac{a_{i,j} + b_{i,j}}{L} - q_i r_j \right)^2.$$

The key observation is that the sketch provides an $(\epsilon, \delta)$-approximation even if p, q, and r are arbitrary vectors (of dimension $n^2$ and n, respectively). The one embodiment samples an $i^* \in [n]$, expressing h(a, b, q, r, L) as $$\sum_i \left( \sum_j \left( \frac{a_{i,j} + b_{i,j}}{L} - q_i r_j \right)^2 \right),$$

and uses binary search to obtain an $i^* \in [n]$ with probability $$\frac{C}{B} \sum_j \left( \frac{a_{i^*,j} + b_{i^*,j}}{L} - q_{i^*} r_j \right)^2$$

for an upper bound B on h(a, b, q, r, L) and a C>1 that can be computed. In the binary search, the one embodiment sums over all i and j in sketches $t_1$, $t_2$, and L above, but for s only sums over the i in the current candidate set (though other embodiments sum over all j∈[n]).

Given the fixing of i*, a coordinate j* is sampled next. This is done by halving the candidate set for j* recursively. In the first step of the binary search, since the parties do not know i* (it is secret-shared), they construct sketches $s_i^A(L) = \Sigma_{j=1}^{n/2} u_i v_j a_{i,j}$, $s_i^A(U) = \Sigma_{j=n/2+1}^n u_i v_j a_{i,j}$, $s_i^B(L) = \Sigma_{j=1}^{n/2} u_i v_j b_{i,j}$, and $s_i^B(U) = \Sigma_{j=n/2+1}^n u_i v_j b_{i,j}$ for each i∈[n], and SPIR is used for an SFE to retrieve $s_{i*}^A(L)$, $s_{i*}^A(U)$, $s_{i*}^B(L)$, and $s_{i*}^B(U)$. Future steps are similar, resulting in a sampled pair (i*, j*) with probability $$\frac{C'}{B}\left(\frac{a_{i*,j*} + b_{i*,j*}}{L} - q_{i*} r_{j*}\right)^2,$$

for a value C'>1 that can be computed, and an upper bound B on h(a, b, q, r, L)=h(a, b). Via rejection sampling, one or more embodiments can flip a coin with probability $$\frac{h(a, b, q, r, L)}{B},$$

and these embodiments can halve B, etc., in a simulatable way to obtain an (ε, δ)-approximation of h(a, b).

Non-Limiting Examples

Aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system. Also, aspects of the present invention have been discussed above with reference to flowchart illustrations and/or block diagrams of methods, apparatus (systems) and computer program products according to embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. An information processing system for automatically transforming a two-party approximation protocol into a private approximation protocol, the information processing comprising:

a memory;

a processor communicatively coupled to the memory; and a private approximation protocol generator communicatively coupled to the memory and the processor, the private approximation protocol generator being configured to perform a method comprising:

receiving a first input $x \in \{0, 1, \ldots, M\}^n$ and a second input $y \in \{0, 1, \ldots, M\}^n$ of a two party approximation protocol (TPAP) for approximating a function of a form $f(x, y) = \sum_{j=1}^{n} g(x_j, y_j)$, where g is any non-negative efficiently computable function;

setting B as a public upper bound on $f(x, y)$ for any possible first input x and any possible second input y;

setting $l = O^*(1)$;

performing the following until $$\sum_{j=1}^{l} z_j \geq \frac{l}{t}$$

or B<1, where t is an arbitrary number:

executing a private importance sampling protocol with the first input x, the second input y, and a third input $1^k$, independently for $j \in [l]$, where k is a security parameter, and an output of the private importance sampling protocol is shares of $I_j \in [n] \cup \{\perp\}$, wherein n is an integer and $\perp$ represents a predefined symbol agreed upon by a first party and a second party, and wherein the private importance sampling protocol is a privately obtained secret share of a sample index i in $\{1, 2, \ldots, n\}$ for the first party and the second party;

independently generating l coin tosses $z_1, \ldots, z_l$, where $z_j = 1$ iff $I_j \neq \perp$; and dividing B by 2 if $$\sum_{j=1}^{l} z_j \geq \frac{l}{t}$$

or B<1 is not satisfied;

determining that $$\sum_{j=1}^{l} z_j \geq \frac{l}{8}$$

or B<1; and outputting a private $(\epsilon, \delta)$-approximation protocol $\Psi$ for $f(x, y) = \sum_{j=1}^{n} g(x_j, y_j)$, where $$\Psi = \frac{2B}{l} \sum_{j=1}^{l} z_j,$$

$\epsilon$ is an arbitrary number, and
$\delta = \exp(-k)$.

2. The information processing system of claim 1, wherein the probability of obtaining a specific index i is equal to $$\frac{g(x_j, y_j)}{B},$$

where a secret share is defined as the first party obtaining $i \oplus r$ and the second party obtaining r, where r is a random bitstring.

3. The information processing system of claim 1, wherein executing the private importance sampling protocol comprises:

initializing a simulator $S=[n]$, $\delta=\exp(-k)$, $$\zeta = \Theta\left(\frac{1}{\log n}\right),$$

$\beta = 1$, and q to be a pointer to a root of a complete binary tree on n leaves; and performing an iterative process for $j=1, 2, \ldots, \log n$, wherein in the j-th iteration the iterative process comprises:

breaking, for each party in the two-party approximation protocol, a coordinate set [n] into $\frac{n}{2^j}$ contiguous blocks of coordinates $x^1, \ldots, x^{2^j}$ and $y^1, \ldots, y^{2^j}$, respectively; and executing, for each party, $$TPAP\left(\frac{n}{2^j}, \zeta, \delta\right)$$

on $x^l$ and $y^l$ for each $l \in [2^j]$, using σ as randomness for each execution, wherein one or more resulting states of TPAP is state $_A(1)$, state $_A(2)$, ..., state $_A(2^j)$ and state $_B(1)$, state $_B(2)$, ..., state $_B(2^j)$.

4. The information processing system of claim 3, wherein the iterative process further comprises performing a secure function evaluation process comprising:

maintaining a state of q;

designating a set $[2^j]$ as internal nodes in a j-th level of a complete binary tree;

utilizing a private information retrieval process to retrieve state $_A$(L), state $_A$(R), state $_B$(L) and state $_B$(R), where L and R are left and right child of q, respectively; combining state $_A$(L) and state $_B$(L) to obtain $$p_L = TPAP\left(\frac{n}{2^j}, \zeta, \delta\right)(x^L, y^L);$$

determining if $(p_L, p_R) \neq (0,0)$;

setting q to point to L with probability $$\frac{p_L}{p_L + p_R} \text{ and } \beta = \beta \cdot \frac{p_L}{p_L + p_R}$$

in response to $(p_L, p_R) \neq (0,0)$;

otherwise setting q to point to R and outputting a pointer to q to $\perp$;

determining that j=log n;

outputting a secret-sharing (e, f) of q and β to each party in the two-party approximation protocol;

reconstructing q and β using inputs e and f;

outputting a secret-sharing of $\perp$ to each party in the two-party approximation protocol if q points to $\perp$;

if q fails to point to $\perp$:

utilizing a private information retrieval process to retrieve $x_q$ and $y_q$; and computing $g(x_q, y_q)$;

setting $$p = \frac{g(x_q, y_q)}{B \cdot \beta};$$

outputting, while with probability p a secret sharing of q to each party in the two-party approximation protocol if p≤1; and outputting, while with a probability of 1-p a secret sharing of $\perp$ to each party in the two-party approximation protocol if p≤1.

5. A computer program product for automatically transforming a two-party approximation protocol into a private approximation protocol, the computer program product comprising:

a non-transitory storage medium readable by a processing circuit and storing instructions for execution by the processing circuit for performing a method comprising:

receiving a first input $x \in \{0, 1, \ldots, M\}^n$ and a second input $y \in \{0, 1, \ldots, M\}^n$ of a two party approximation protocol (TPAP) for approximating a function of a form $f(x, y) = \sum_{j=1}^n g(x_j, y_j)$, where g is any non-negative efficiently computable function;

setting B as a public upper bound on $f(x, y)$ for any possible first input x and any possible second input y;

setting l=O*(1);

performing the following until $$\sum_{j=1}^l z_j \geq \frac{l}{t}$$

or B<1, where t is an arbitrary number:

executing a private importance sampling protocol with the first input x, the second input y, and a third input $1^k$, independently for $j \in [l]$, where k is a security parameter, and an output of the private importance sampling protocol is shares of $I_j \in [n] \cup \{\perp\}$, wherein n is an integer and $\perp$ represents a predefined symbol agreed upon by a first party and a second party, and wherein the private importance sampling protocol is a privately obtained secret share of a sample index i in $\{1, 2, \ldots, n\}$ for the first party and the second party;

independently generating l coin tosses $z_1, \ldots, z_l$, where $z_j=1$ iff $I_j \neq \perp$; and dividing B by 2 if $$\sum_{j=1}^l z_j \geq \frac{l}{t}$$

or B<1 is not satisfied;

determining that $$\sum_{j=1}^l z_j \geq \frac{l}{8}$$

or B<1; and outputting a private (ε, δ)-approximation protocol Ψ for $f(x, y) = \sum_{j=1}^n g(x_j, y_j)$, where $$\Psi = \frac{2B}{l} \sum_{j=1}^l z_j,$$

ε is an arbitrary number, and δ=exp(-k).

6. The computer program product of claim 5, wherein the probability of obtaining a specific index i is equal to $$\frac{g(x_j, y_j)}{B},$$

where a secret share is defined as the first party obtaining i⊕r and the second party obtaining r, where r is a random bitstring.

7. The computer program product of claim 5, wherein executing the private importance sampling protocol comprises:

initializing a simulator S=[n], δ=exp(−k), $$\zeta = \Theta\left(\frac{1}{\log n}\right),$$

β=1, and q to be a pointer to a root of a complete binary tree on n leaves; and performing an iterative process for j=1, 2, . . . , log n, wherein in the j-th iteration the iterative process comprises:

breaking, for each party in the two-party approximation protocol, a coordinate set [n] into $$\frac{n}{2^j}$$

contiguous blocks of coordinates $x^1, \ldots, x^{2^j}$ and $y^1, \ldots, y^{2^j}$, respectively; and executing, for each party, $$TPAP\left(\frac{n}{2^j}, \zeta, \delta\right)$$

on $x^l$ and $y^l$ for each $l \in [2^j]$, using σ as randomness for each execution, wherein one or more resulting states of TPAP is state$_A(1)$, state$_A(2)$, . . . , state$_A(2^j)$ and state$_B(1)$, state$_B(2)$, . . . , state$_B(2^j)$.

8. The computer program product of claim 7, wherein the iterative process further comprises performing a secure function evaluation process comprising:

maintaining a state of q;

designating a set $[2^j]$ as internal nodes in a j-th level of a complete binary tree;

utilizing a private information retrieval process to retrieve state$_A$(L), state$_A$(R), state$_B$(L) and state$_B$(R), where L and R are left and right child of q, respectively;

combining state$_A$(L) and state$_B$(L) to obtain $$p_L = TPAP\left(\frac{n}{2^j}, \zeta, \delta\right)(x^L, y^L);$$

determining if $(p_L, p_R) \neq (0,0)$;

setting q to point to L with probability $$\frac{p_L}{p_L + p_R} \text{ and } \beta = \beta \cdot \frac{p_L}{p_L + p_R}$$

in response to $(p_L, p_R) \neq (0,0)$;

otherwise setting q to point to R and outputting a pointer to q to ⊥;

determining that j=log n;

outputting a secret-sharing (e, f) of q and β to each party in the two-party approximation protocol;

reconstructing q and β using inputs e and f;

outputting a secret-sharing of ⊥ to each party in the two-party approximation protocol if q points to ⊥;

if q fails to point to ⊥:
utilizing a private information retrieval process to retrieve $x_q$ and $y_q$; and
computing $g(x_q, y_q)$;

setting $$p = \frac{g(x_q, y_q)}{B \cdot \beta};$$

outputting, while with probability p a secret sharing of q to each party in the two-party approximation protocol if p≤1; and outputting, while with a probability of 1−p a secret sharing of ⊥ to each party in the two-party approximation protocol if p≤1.

9. The computer program product of claim 8, further comprising:

reconstructing q and β using inputs e and f;

outputting a secret-sharing of ⊥ to each party in the two-party approximation protocol if q points to ⊥;

if q fails to point to ⊥:
utilizing a private information retrieval process to retrieve $x_q$ and $y_q$; and
computing $g(x_q, y_q)$;

setting $$p = \frac{g(x_q, y_q)}{B \cdot \beta};$$

outputting, while with probability p a secret sharing of q to each party in the two-party approximation protocol if p≤1; and outputting, while with a probability of 1−p a secret sharing of ⊥ to each party in the two-party approximation protocol if p≤1.

\* \* \* \* \*